(12) United States Patent
Takeuchi et al.

(10) Patent No.: US 10,347,208 B2
(45) Date of Patent: Jul. 9, 2019

(54) DISPLAY DEVICE

(71) Applicant: Samsung Display Co., Ltd., Yongin-si (KR)

(72) Inventors: Noboru Takeuchi, Asan-si (KR); Jonghwan Lee, Asan-si (KR); Kangnam Kim, Seoul (KR); Beomjun Kim, Seoul (KR); Hongwoo Lee, Seoul (KR); Youmee Hyun, Bucheon-si (KR)

(73) Assignee: Samsung Dispiay Co., Ltd., Yongin-si (KR)

( * ) Notice: Subject to any disclaimer, the term of this patent is extended or adjusted under 35 U.S.C. 154(b) by 118 days.

(21) Appl. No.: 15/445,025

(22) Filed: Feb. 28, 2017

(65) Prior Publication Data

US 2018/0005594 A1    Jan. 4, 2018

(30) Foreign Application Priority Data

Jul. 4, 2016    (KR) .................. 10-2016-0084263

(51) Int. Cl.
*G09G 3/36*    (2006.01)
*G02F 1/1362*    (2006.01)
(Continued)

(52) U.S. Cl.
CPC ......... *G09G 3/3677* (2013.01); *G02F 1/1368* (2013.01); *G02F 1/13439* (2013.01);
(Continued)

(58) Field of Classification Search
CPC ............ G09G 3/3677; G02F 1/133514; G02F 1/134309; G02F 1/13439; G02F 1/136209; G02F 1/136286; G02F 1/1368
(Continued)

(56) References Cited

U.S. PATENT DOCUMENTS 8,223,111 B2    7/2012 Liao et al.
8,405,803 B2 *  3/2013 Kim .................. G02F 1/134363
                                                    257/59
(Continued)

FOREIGN PATENT DOCUMENTS

JP    2010-218673    9/2010
KR    10-2008-0002412    1/2008
(Continued)

OTHER PUBLICATIONS

Hidefurni Yoshida et al., "Flexible Flat-Panel Display Designs with Gate Driver Circuits integrated within the Pixel Area", Sharp Corporation, Nara, Japan, ISSN 0097-0966X/14/4502, SID 2014 Digest, pp. 701-704.
(Continued)

*Primary Examiner* — Carolyn R Edwards
(74) *Attorney, Agent, or Firm* — H.C. Park & Associates, PLC

(57) ABSTRACT

A display device with space for accommodating elements of a gate driver in a display area of the display device, the display device including first and second adjacent pixel electrodes, and third and fourth adjacent pixel electrodes; a gate line extending between the first pixel electrode and the second pixel electrode and between the third pixel electrode and the fourth pixel electrode; a gate driver having a plurality of elements and configured to drive the gate line; and a light blocking layer overlapping the gate line, wherein the light blocking layer comprises a first light blocking portion and a second light blocking portion, the first light blocking portion is adjacent to the first pixel electrode and the second pixel electrode, the second light blocking portion is adjacent to the third pixel electrode and the fourth pixel electrode, the second light blocking portion having a larger size than a size of the first light blocking portion, and at least one of the plurality of elements of the gate driver overlaps the second light blocking portion.

19 Claims, 15 Drawing Sheets

(51) Int. Cl.
*G02F 1/1368* (2006.01)
*G02F 1/1343* (2006.01)
*G02F 1/1335* (2006.01)

(52) U.S. Cl.
CPC .. *G02F 1/133514* (2013.01); *G02F 1/134309* (2013.01); *G02F 1/136209* (2013.01); *G02F 1/136286* (2013.01); *G02F 2201/123* (2013.01); *G09G 2310/08* (2013.01)

(58) Field of Classification Search
USPC .......................................................... 345/204
See application file for complete search history.

(56) References Cited

U.S. PATENT DOCUMENTS

| | | | |
|---|---|---|---|
| 8,816,728 B2 | 8/2014 | Yoon et al. | |
| 9,091,884 B2* | 7/2015 | Kim | G02F 1/13363 |
| 10,042,199 B2* | 8/2018 | Yoon | G02F 1/133512 |
| 2004/0169807 A1* | 9/2004 | Rho | G02F 1/133514 |
| | | | 349/139 |
| 2008/0272997 A1* | 11/2008 | Shin | G02F 1/134336 |
| | | | 345/87 |
| 2008/0316413 A1* | 12/2008 | Cho | G02F 1/134309 |
| | | | 349/144 |
| 2009/0086116 A1* | 4/2009 | Pak | G09G 3/3655 |
| | | | 349/38 |
| 2012/0327340 A1* | 12/2012 | Ochiai | G02F 1/133512 |
| | | | 349/108 |
| 2014/0211133 A1* | 7/2014 | Huh | G02F 1/133512 |
| | | | 349/104 |
| 2015/0301382 A1* | 10/2015 | Ishitani | G06F 3/0412 |
| | | | 349/12 |

FOREIGN PATENT DOCUMENTS

| | | |
|---|---|---|
| KR | 10-2013-0083151 | 7/2013 |
| WO | 2014/069529 | 5/2014 |
| WO | 2014/142183 | 9/2014 |
| WO | 2015/033838 | 3/2015 |

OTHER PUBLICATIONS

Hidefumi Yoshida et al., "Flexible Flat-Panel Display Designs with Gate Driver Circuits Integrated within the Pixel Area", Sharp Corporation, Nara, Japan, 59.1.H. Yoshida, ISSN 0097-966X/15/4502-0879, SID 2015 Digest, pp. 879-882.

Chih-Lung Lin, et al., "Simplified Gate Driver Circuit for High-Resolution and Narrow-Bezel Thin-Film Transistor Liquid Crystal Display Applications", IEEE Electron Device Letters, vol. 36, No. 8, Aug. 2015, pp. 808-810.

* cited by examiner

DISPLAY DEVICE

CROSS-REFERENCE TO RELATED APPLICATION

This application claims priority from and the benefit of Korean Patent Application No. 10-2016-0084263, filed on Jul. 4, 2016, which is hereby incorporated by reference for all purposes as if fully set forth herein.

BACKGROUND

Field

The invention relates generally to a display device, and, more particularly, to a display device having a display area and a non-display area in which the elements of the gate driver may be disposed in the display area.

Discussion of the Background

A display device generally includes a plurality of pixels for displaying an image, a plurality of gate lines connected to the plurality of pixels, and a gate driver for driving the gate lines.

The gate driver includes a shift register and other component parts which are typically included in a non-display area of a display panel, e.g. in the bezel area disposed around the display.

As the size of shift registers has increased in accordance with an increase in size of display devices, the area in the non-display area that the shift register occupies also has increased. As the area required to accommodate the shift register increases, the size of the bezel of the display device also must increase. Accordingly, the volume of the display device also increases and, in turn, the sense of immersion a viewer has in an image displayed on a screen may be diminished.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments of the invention provide a display device in which the space required by the components of the gate driver may be accommodated in a display area of the display device rather than in a non-display area of the display device, such as the bezel. By locating the gate driver in the display area of the display device, the need for a larger bezel or other non-display portion of the display device may be reduced or eliminated.

A viewer's sense of immersion in images displayed on a display device is reduced as the size of the bezel of the display device increases. According to the principles of the invention, the area required to accommodate the components of the gate driver may increase without reducing a viewer's sense of immersion in images displayed on the display device.

Additional aspects will be set forth in the detailed description which follows, and, in part, will be apparent from the disclosure, or may be learned by practice of the inventive concept.

According to one aspect of the invention, a display device includes first and second adjacent pixel electrodes, and third and fourth adjacent pixel electrodes; a gate line extending between the first pixel electrode and the second pixel electrode and between the third pixel electrode and the fourth pixel electrode; a gate driver having a plurality of elements and configured to drive the gate line; and a light blocking layer overlapping the gate line, wherein the light blocking layer comprises a first light blocking portion and a second light blocking portion, the first light blocking portion is adjacent to the first pixel electrode and the second pixel electrode, the second light blocking portion is adjacent to the third pixel electrode and the fourth pixel electrode, the second light blocking portion having a larger size than a size of the first light blocking portion, and at least one of the plurality of elements of the gate driver overlaps the second light blocking portion.

The display device may further include a first white color filter disposed corresponding to the third pixel electrode.

The third pixel electrode has a different size from a size of the fourth pixel electrode.

The display device may further include a first white color filter disposed corresponding to the third pixel electrode that has a smaller size than a size of the other.

The third pixel electrode has a smaller size than a size of the other, and the first pixel electrode has substantially the same size as the second pixel electrode, the second pixel electrode has substantially the same size as the fourth pixel electrode.

The display device may further include a first white color filter disposed corresponding to the third pixel electrode; and a red color filter, a green color filter, and a blue color filter respectively disposed corresponding to the first pixel electrode, the second pixel electrode, and the fourth pixel electrode.

At least another of the plurality of elements of the gate driver overlaps the first light blocking portion.

A size of the element overlapping the second light blocking portion is larger than a size of the element overlapping the first light blocking portion.

The plurality of elements of the gate driver comprises at least one driving switching element and at least one capacitor.

The second light blocking portion has substantially a same length as a length of the first light blocking portion, and the second light blocking portion has a greater width than a width of the first light blocking portion.

The plurality of elements of the gate driver comprise: a first driving switching element controlled based on a previous gate signal applied from a previous gate line and connected between the previous gate line and a set node; a second driving switching element controlled based on a succeeding gate signal applied from a succeeding gate line and connected between the set node and an off-voltage line; a third driving switching element controlled based on a voltage applied from the set node and connected between a first clock line and the gate line; and a capacitor connected between the set node and the gate line.

The plurality of elements of the gate driver further comprise a fourth driving switching element controlled based on a second clock signal applied from a second clock line and connected between the gate line and the off-voltage line.

At least one of the first driving switching element and the fourth driving switching element overlaps the first light blocking portion.

At least one of the second driving switching element, the third driving switching element, and the capacitor overlaps the second light blocking portion.

The display device may further include a data line intersecting the gate line, wherein the light blocking layer further comprises a third light blocking portion overlapping the data line.

The display device may further include a substrate on which the plurality of elements of the gate driver are disposed, wherein at least one of the plurality of elements overlaps the second light blocking portion in a display area of the substrate.

At least one of the plurality of elements is disposed between the display area of the substrate and the second light blocking portion.

The display device may further include a fifth pixel electrode adjacent to the third pixel electrode, a sixth pixel electrode adjacent to the fourth pixel electrode, a seventh pixel electrode adjacent to the fifth pixel electrode, and an eighth pixel electrode adjacent to the sixth pixel electrode, wherein the gate line extends between the fifth pixel electrode and the sixth pixel electrode and between the seventh pixel electrode and the eight pixel electrode.

The display device may further include a second white color filter disposed corresponding to the eighth pixel electrode.

The eighth pixel electrode has a smaller size than a size of the other, and the fifth pixel electrode has substantially the same size as the sixth pixel electrode, the sixth pixel electrode has substantially the same size as the seventh pixel electrode.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
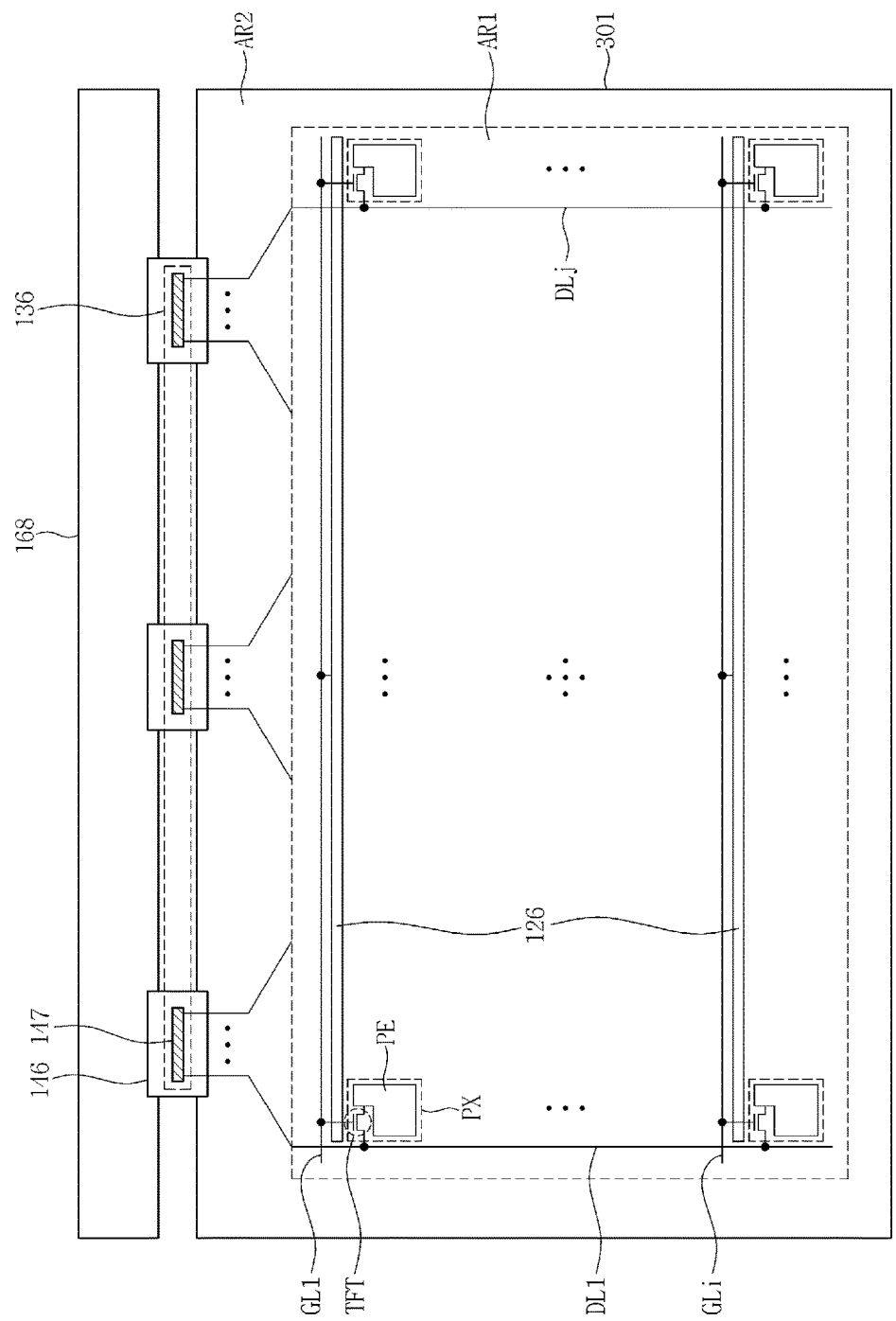
FIG. 1 is a schematic plan view of an exemplary embodiment of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic plan view of an exemplary embodiment of a display device constructed according to the principles of the invention.

As illustrated in the exemplary embodiment of FIG. 1, a display device includes a first substrate 301, a data driver 136, a gate driver 126, and a circuit board 168.

Figure 7:
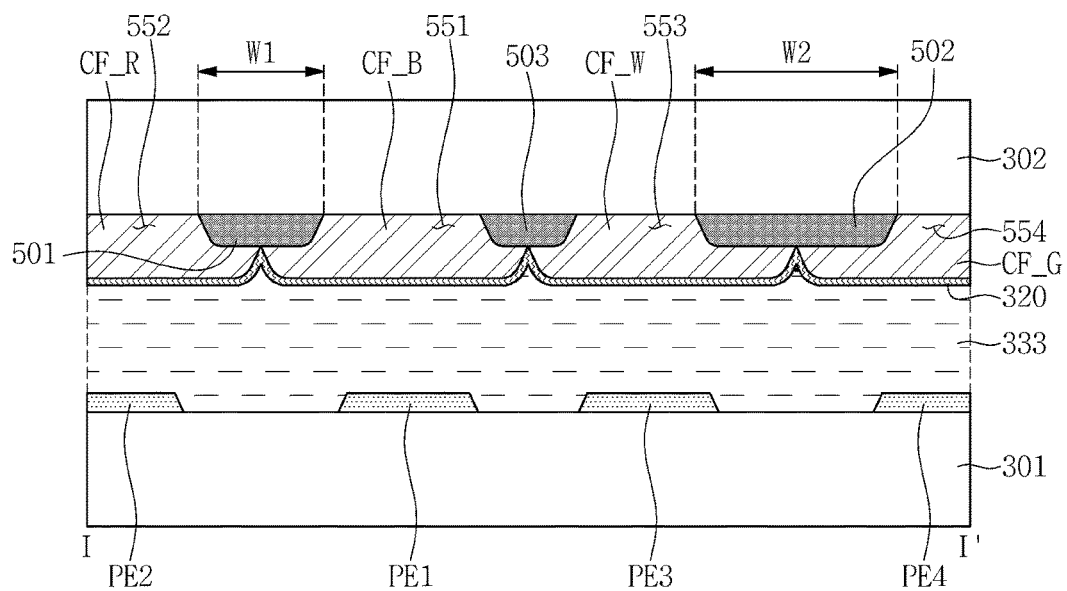
FIG. 7 is a cross-sectional view taken along line I-I' of FIG. 6.

Various exemplary embodiments of a display device may further include a second substrate 302 (refer to FIG. 7) and a liquid crystal layer 333 (refer to FIG. 7). The second substrate 302 may be disposed to oppose the first substrate 301. The liquid crystal layer 333 may be disposed between the first substrate 301 and the second substrate 302.

The first substrate 301 may have a display area AR1 and a non-display area AR2.

A plurality of gate lines GL1 to GLi, a plurality of data lines DL1 to DLj, a plurality of pixel electrodes PE, and a plurality of switching elements TFT may be disposed in the display area AR1 of the first substrate 301.

The data lines DL1 to DLj intersect the gate lines GL1 to GLi. The data lines DL1 to DLj extend to the non-display area AR2 to be connected to the data driver 136.

The data driver 136 includes a plurality of data driving integrated circuits 147. The data driving integrated circuits 147 receive digital image data signals and a data control signal from a timing controller. The data driving integrated circuits 147 sample the digital image data signals based on the data control signal, latch the sampled image data signals corresponding to one horizontal line in each horizontal period, and apply the latched image data signals to the data lines DL1 to DLj. That is, the data driving integrated circuits 147 convert the digital image data signals applied from the timing controller into analog image signals using a gamma voltage applied from a power supplier and apply the converted analog image signals to the data lines DL1 to DLj.

Each of the data driving integrated circuits 147 may be mounted on a data carrier 146. The data carriers 146 may be connected between the circuit board 168 and the first substrate 301. For example, each of the data carriers 146 may be electrically connected between the circuit board 168 and the non-display area AR2 of the first substrate 301.

The aforementioned timing controller and the power supplier may be disposed on the circuit board 168, and the data carrier 146 includes input wirings which transmit various signals applied from the timing controller and the power supplier to the data driving integrated circuits 147 and output wirings that transmit image data signals output from the data driving integrated circuits 147 to corresponding ones of the data lines DL1 to DLj. In various exemplary embodiments, at least one carrier 146 may further include auxiliary wirings that may transmit various signals applied from the timing controller and the power supplier to the gate driver 236, and the auxiliary wirings may be connected to panel wirings on the first substrate 301. The panel wirings connect the auxiliary wirings and the gate driver 126 to one another. The panel wirings may be disposed in the non-display area AR2 of the first substrate 301 in a line-on-glass manner.

A plurality of pixels PX may be disposed in the display area AR1 of the first substrate 301. The pixels PX may be arranged in a matrix form. The pixels PX may include a red pixel displaying a red image, a green pixel displaying a green image, a blue pixel displaying a blue image, and a white pixel displaying a white image. In such exemplary embodiments, a red pixel, a green pixel, a blue pixel, and a white pixel that may be adjacently disposed to one another may define a unit pixel for displaying a unit image.

There may be "j" number of pixels PX (hereinafter, n-th horizontal line pixels) arranged along an n-th (n is a number selected from 1 to i) horizontal line, and the n-th horizontal line pixels may be connected to first to j-th data lines DL1 to DLj, respectively. In addition, the n-th horizontal line pixels may be connected to an n-th gate line together. Accordingly, the n-th horizontal line pixels receive an n-th gate signal as a common signal. That is, "j" number of pixels arranged in a same horizontal line receive a same gate signal, while pixels arranged in different horizontal lines receive different gate signals, respectively.

The pixel PX may include a pixel electrode PE and a pixel switching element TFT. The pixel electrode PE and the pixel switching element TFT included in a single pixel PX may be connected to each other. The pixel switching element TFT may be connected to the gate line, the data line, and the pixel electrode PE. For example, a gate electrode of the pixel switching element TFT may be connected to the gate line, a source electrode of the pixel switching element TFT may be connected to the data line, and a drain electrode of the pixel switching element TFT may be connected to the pixel electrode PE.

The gate lines GL1 to GLi may be driven by the gate driver 126. As illustrated in FIG. 1, the gate driver 126 may be disposed in the display area AR1 of the first substrate 301. In such exemplary embodiments, the gate driver 126 overlaps a light blocking layer 500 (refer to FIG. 5).

Figure 2:
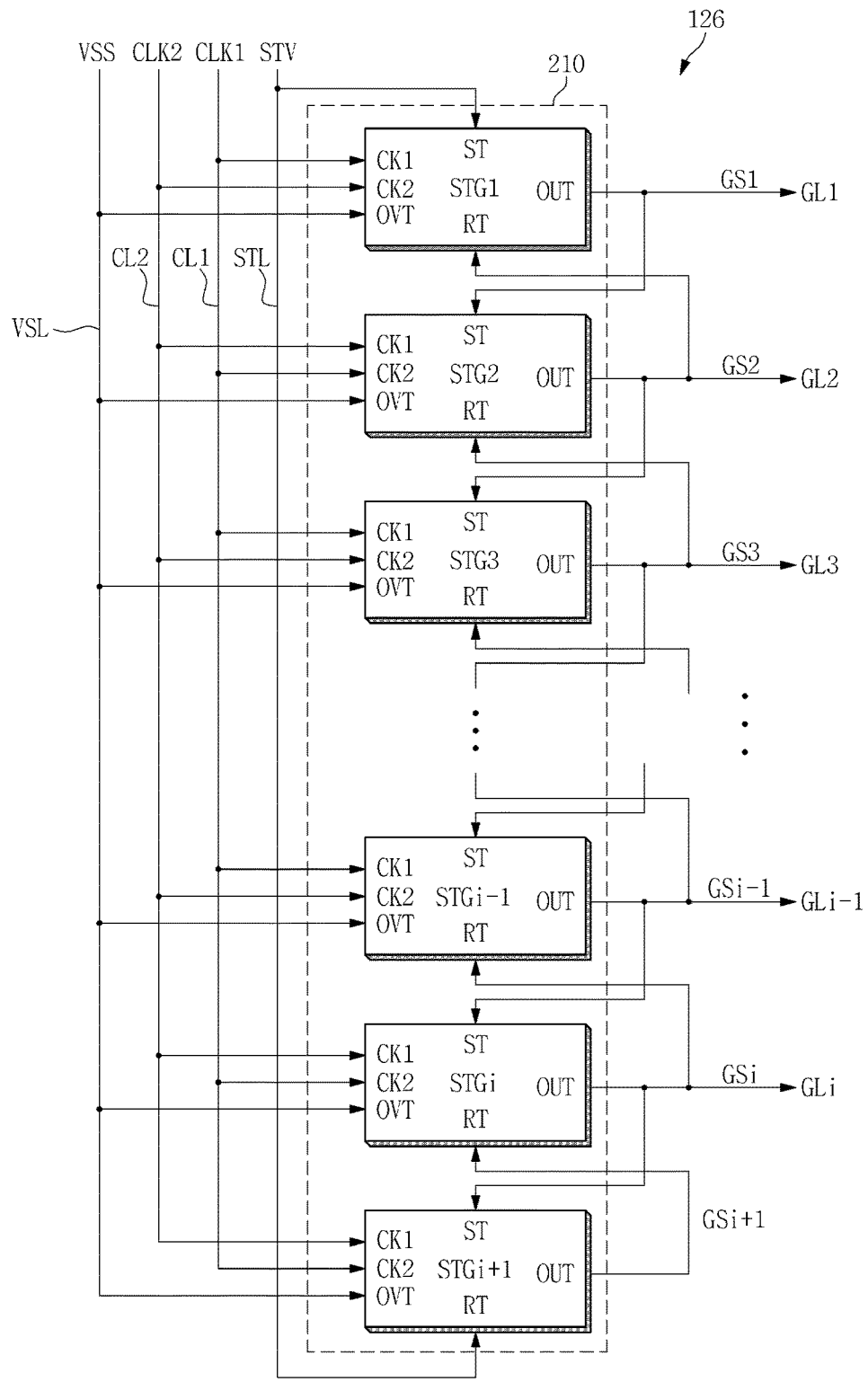
FIG. 2 is a block circuit diagram of the gate driver of FIG. 1.
Figure 3:
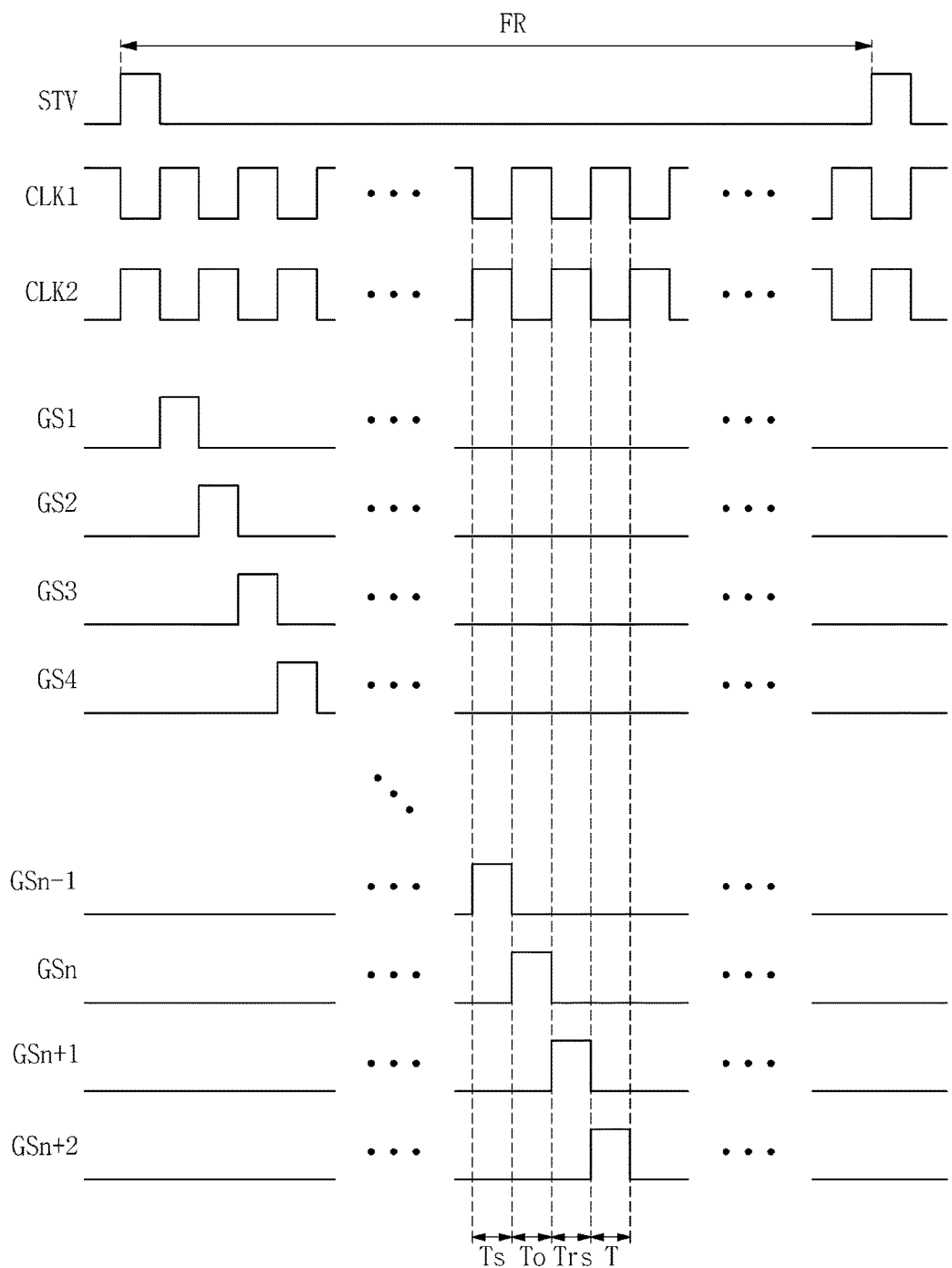
FIG. 3 is a graph of exemplary input signals applied to the gate driver of FIG. 2 and exemplary output signals output from the gate driver.

FIG. 2 is a block circuit diagram of the gate driver of FIG. 1, and FIG. 3 is a graph of exemplary input signals applied to the gate driver of FIG. 2 and exemplary output signals output from the gate driver.

As illustrated in FIG. 2, the gate driver 126 includes a shift register 210.

The shift register 210 includes first to (i+1)-th stages STG1 to STGi+1 connected to one another in a dependent manner. The first to i-th stages STG1 to STGi may be defined as a driving stage, and the (i+1)-th stage STGi+1 may be defined as a dummy stage.

Each of the first to (i+1)-th stages STG1 to STGi+1 includes a first clock terminal CK1, a second clock terminal CK2, an off-voltage terminal OVT, a set control terminal ST, an output terminal OUT, and a reset control terminal RT.

Each of the stages STG1 to STGi receives a set control signal applied through each corresponding one of the set control terminals ST. Herein, a set control signal applied to a predetermined one of the stages may be a gate signal output from at least one of stages (i.e., previous stages) that may be driven prior to the predetermined one of the stages. For example, as illustrated in FIG. 2, the second stage STG2 receives a first gate signal GS1 output from the first stage STG1. In some other embodiments, a set control signal of an n-th stage (n being a natural number) may be a gate signal output from one of stages that may be positioned further ahead of the previous stage, for example, an (n−y)-th stage (y being a natural number greater than 2 and less than "n").

A set control signal input to the first stage ST1 which may be operated firstly in a single frame period FR may be a start vertical signal STV that notices the start of one frame. The start vertical signal STV may be input to the set input terminal ST of the first stage STG1.

Each of the stages STG1 to STGi receives a reset control signal through each corresponding one of the reset control terminals RT. Herein, a reset control signal applied to a predetermined one of the stages may be a carry signal or a gate signal output from at least one of stages (i.e., succeeding stages) that may be driven subsequently to the predetermined one of the stages. For example, as illustrated in FIG. 2, the second stage STG2 receives a third gate signal GS3 output from the third stage STG3. In some other embodiments, a reset control signal of the n-th stage may be a gate signal output from one of stages that may be positioned further behind the succeeding stage, for example, an (n+z)-th stage (z being a natural number greater than 2).

A reset control signal that may be applied to the i-th stage STGi, which may be operated lastly in the single frame period FR among the stages for driving the gate line, may be a dummy gate signal GSi+1. The dummy gate signal GSi+1 may be output from the dummy stage STGi+1. In some other embodiments, the start vertical signal STV may be used as the reset control signal of the last stage STGi.

A reset control signal applied to the dummy stage STGi+1 which may be operated lastly in the single frame period FR may be the aforementioned start vertical signal STV. The start vertical signal STV may be input to the reset control terminal RT of the dummy stage STGi+1. The output terminal OUT of the dummy stage STGi+1 might not be connected to the gate line.

The first to i-th stages STG1 to STGi may be connected to the first to i-th gate lines GL1 to GLi. For example, the respective output terminals OUT of the first to i-th stages STG1 to STGi may be connected to the first to i-th gate lines GL1 to GLi, respectively. The first to i-th stages STG1 to STGi sequentially output the first to i-th gate signals GS1 to GSi to the first to i-th gate lines GL1 to GLi. That is, the gate signal includes a gate high voltage and a gate low voltage, and first to i-th gate high voltages may be sequentially output to the first to i-th gate lines GL1 to GLi.

The first clock signal CLK1, as illustrated in FIG. 3, may be a pulse signal having a high voltage and a low voltage, periodically, and the high voltage of the first clock signal CLK1 may have a level that may turn on the aforementioned pixel switching element TFT and a driving switching element in the stage to be described below. The low voltage of the first clock signal CLK1 may have a level that may turn off the aforementioned pixel switching element TFT and the driving switching element in the stage to be described below.

The second clock signal CLK2 may have an inverted phase with respect to the first clock signal CLK1. For example, the second clock signal CLK2 may have a phase shifted by 180 degrees with respect to the first clock signal CLK1. The low voltage of the second clock signal CLK2 may have a level that may turn off the aforementioned pixel switching element TFT and the driving switching element in the stage to be described below. The second clock signal CLK2 may be a pulse signal having a high voltage and a low voltage, periodically, and the high voltage of the second clock signal CLK2 may have a level that may turn on the aforementioned pixel switching element TFT and the driving switching element in the stage to be described below.

The first and second clock signals CLK1 and CLK2 may be output to overlap each other. For example, in a case where a high period of the first clock signal CLK1 may be divided into a first half period and a second half period, and a high period of the second clock signal CLK2 may be divided into a first half period and a second half period, the second half period of the first clock signal CLK1 and the first half period of the second clock signal CLK2 may overlap each other in time.

In addition, the start vertical signal STV may overlap one of the first and second clock signals CLK1 and CLK2. In such exemplary embodiments, the start vertical signal STV may overlap the entirety of the clock signal or a part of the clock signal.

The first clock signal CLK1 and the second clock signal CLK2 may be applied from the timing controller of the circuit board 168. The first clock signal CLK1 output from the timing controller may be applied to each of the first to (i+1)-th stages STG1 to STGi+1 through the first clock line CL1. The second clock signal CLK2 output from the timing controller may be applied to the first to (i+1)-th stages STG1 to STGi+1 through the second clock line CL2.

Clock signals having opposite phases may be respectively input to the first clock terminal CK1 and the second clock terminal CK2 of each of the first to (i+1)-th stages STG1 to STGi+1. For example, the first clock signal CLK1 may be input to the first clock terminals CK1 of the odd-numbered stages STG1, STG3, . . . , and STGi−1, and the second clock signal CLK2 may be input to the second clock terminals CK2 of the odd-numbered stages STG1, STG3, . . . , and STGi−1. On the contrary, the second clock signal CLK2 may be input to the first clock terminals CK1 of the even-numbered stages STG2, STG4, . . . , STGi, and the first clock signal CLK1 may be input to the second clock terminals CK2 of the even-numbered stages STG2, STG4, . . . , STGi.

Each of the first to (i+1)-th stages STG1 to STGi+1 generates the gate signal using the clock signal input to each corresponding one of the first clock terminals CK1. For example, the first stage STG1 generates the first gate signal GS1 using the first clock signal CLK1 input to the first clock terminal CK1 of the first stage STG1, and the second stage STG2 generates the second gate signal GS2 using the second clock signal CLK2 input to the first clock terminal CK1 of the second stage STG2.

Each of the stages STG1 to STGi+1 discharges each corresponding one of the output terminals OUT according to timing of the clock signal input to each corresponding one of the second clock terminals CK2. For example, the first stage STG1 discharges the output terminal OUT of the first stage STG1 to a level of an off-voltage VSS, in the high period of the second clock signal CLK2 input to the second clock terminal CK2 of the first stage STG1. The second stage STG2 discharges the output terminal OUT of the second stage STG2 to a level of the off voltage VSS in the high period of the first clock signal CLK1 input to the second clock terminal CK2 of the second stage STG2.

Each of the stages STG1 to STGi+1 receives the off voltage VSS through each corresponding one of the off voltage terminals OVT. The off voltage VSS may be a direct current (DC) voltage. The low voltage of the first clock signal CLK1 may have substantially a same level as a level of the off voltage VSS. Similarly, the low voltage of the second clock signal CLK2 may have substantially a same level as the level of the off voltage VSS.

The off voltage VSS may be applied from the power supplier of the circuit board 168. The off voltage VSS output from the power supplier may be applied as a common signal to each of the stages STG1 to STGi+1 through an off-voltage line VSL.

Each of the stages STG1 to STGi+1 generates the gate signal based on the clock signal input through the first clock terminal CK1, and outputs the generated gate signal through the output terminal OUT. For example, the odd-numbered stages STG1, STG3, . . . , and STGi−1 generate the gate signal based on the first clock signal CLK1 and output the generated gate signal through the output terminals OUT. On the other hand, the even-numbered stages STG2, STG4, . . . , STGi generate the gate signal based on the second clock signal CLK2 and output the generated gate signal through the output terminals OUT.

Figure 4:
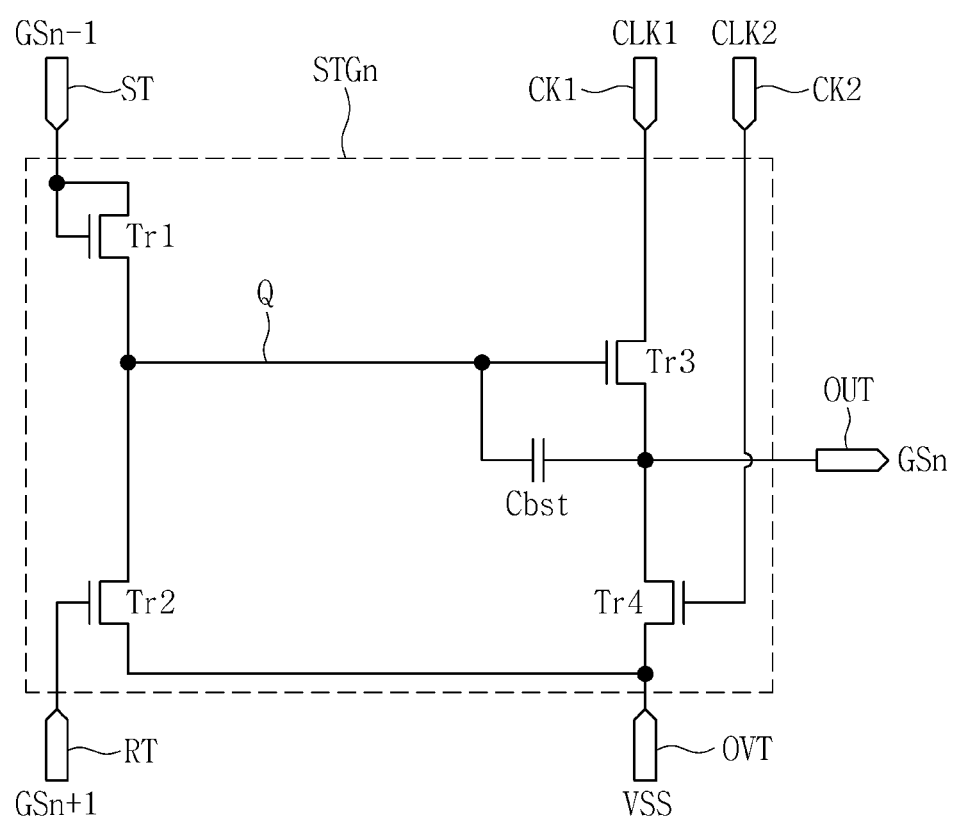
FIG. 4 is a circuit diagram of an exemplary one of the stages, i.e., an n-th stage, of FIG. 2.

FIG. 4 is a circuit diagram of an exemplary one of the stages, i.e., an n-th stage, of FIG. 2.

As illustrated in FIG. 4, the n-th stage STGn includes a first driving switching element Tr1, a second driving switching element Tr2, a third driving switching element Tr3, a fourth driving switching element Tr4, and a boost capacitor Cbst.

The first driving switching element Tr1 of the n-th stage STGn charges a set node Q of the n-th stage STGn based on the set control signal. The set control signal may be an (n−1)-th gate signal GSn−1 applied from an (n−1)-th stage STGn−1. The first driving switching element Tr1 of the n-th stage STGn may be turned on or turned off by the (n−1)-th gate signal GSn−1, and when turned on, the first driving switching element Tr1 electrically connects the set control terminal ST of the n-th stage STGn and the set node Q of the n-th stage STGn. To this end, the first driving switching element Tr1 includes a gate electrode connected to the set control terminal ST, a drain electrode connected to the set control terminal ST, and a source electrode connected to the set node Q.

The second driving switching element Tr2 of the n-th stage STGn discharges the set node Q of the n-th stage STGn based on the reset control signal. The reset control signal may be an (n+1)-th gate signal GSn+1 applied from an (n+1)-th stage STGn+1. The second driving switching element Tr2 of the n-th stage STGn may be turned on or turned off by the (n+1)-th gate signal GSn+1, and when turned on, the second driving switching element Tr2 electrically connects the set node Q of the n-th stage STGn and the off voltage terminal OVT. To this end, the second driving switching element Tr2 includes a gate electrode connected to the reset control terminal RT, a drain electrode connected to the set node Q, and a source electrode connected to the off voltage terminal OVT.

The third driving switching element Tr3 of the n-th stage STGn outputs the first clock signal CLK1 as the n-th gate signal GSn, based on a signal of the set node Q of the n-th stage STGn. The third driving switching element Tr3 of the n-th stage STGn may be turned on or turned off by the signal of the set node Q, and when turned on, the third driving switching element Tr3 electrically connects the first clock terminal CK1 of the n-th stage STGn and the output terminal OUT of the n-th stage STGn. To this end, the third driving switching element Tr3 includes a gate electrode connected to the set node Q, a drain electrode connected to the first clock terminal CK1, and a source electrode connected to the output terminal OUT.

The fourth driving switching element Tr4 of the n-th stage STGn discharges the output terminal OUT of the n-th stage STGn based on the second clock signal CLK2. The fourth driving switching element Tr4 of the n-th stage STGn may be turned on or turned off by the second clock signal CLK2, and when turned on, the fourth driving switching element Tr4 electrically connects the output terminal OUT of the n-th stage STGn and the off voltage terminal OVT. To this end, the fourth driving switching element Tr4 includes a gate electrode connected to the second clock terminal CK2, a drain electrode connected to the output terminal OUT, and a source electrode connected to the off voltage terminal OVT.

Hereinbelow, an operation of the n-th stage STGn will be described in detail with reference to FIGS. 3 and 4.

1) Set Period (Ts)

The operation of the n-th stage STGn in a set period Ts of the n-th stage STGn will be described hereinbelow.

In the set period Ts of the n-th stage STGn, as illustrated in FIG. 3, the first clock signal CLK1 maintains a low voltage level, the second clock signal CLK2 maintains a high voltage level, and the (n−1)-th gate signal GSn−1 applied from the (n−1)-th stage STGn−1 maintains a high voltage level.

The (n−1)-th gate signal GSn−1, having a high voltage level, output from the (n−1)-th stage STGn−1 may be applied to the gate electrode and the drain electrode of the first driving switching element Tr1 provided in the n-th stage STGn. Then, the first driving switching element Tr1 of the n-th stage STGn may be turned on, and the (n−1)-th gate signal GSn−1, having a high voltage level, may be applied to the set node Q of the n-th stage STGn through the turned-on first driving switching element Tr1. Accordingly, the set node Q may be charged, and the third driving switching element Tr3 of the n-th stage STGn connected to the charged set node Q through the gate electrode may be turned on.

The fourth driving switching element Tr4 that receives the second clock signal having a high voltage level through the gate electrode may be turned on. The off voltage VSS may be applied to the output terminal OUT through the turned-on fourth driving switching element Tr4.

In various exemplary embodiments, as illustrated in FIG. 3, the (n+1)-th gate signal GSn+1 maintains a low voltage level in the set period Ts, and the second driving switching element Tr2 that receives the (n+1)-th gate signal GSn+1 having a low voltage level through the gate electrode may be turned off.

As such, in the set period Ts of the n-th stage STGn, the set node Q of the n-th stage STGn may be charged to a high voltage level.

2) Output Period (To)

Subsequently, the operation of the n-th stage STGn in an output period To of the n-th stage STGn will be described.

In the output period To of the n-th stage STGn, as illustrated in FIG. 3, the first clock signal CLK1 maintains a high voltage level, the second clock signal CLK2 maintains a low voltage level, and the (n−1)-th gate signal GSn−1 applied from the (n−1)-th stage STGn−1 maintains a low voltage level.

The (n−1)-th gate signal GSn−1, having a low voltage level, output from the (n−1)-th stage STGn−1 may be applied to the gate electrode of the first driving switching element Tr1 provided in the n-th stage STGn. Accordingly, the first driving switching element Tr1 may be turned off. As the first driving switching element Tr1 may be turned off, the set node Q of the n-th stage STGn may be floated in the output period To. The set node Q in a floating state maintains a charged state by the (n−1)-th gate signal GSn−1, having a high voltage level, which may be applied thereto in the aforementioned set period Ts. Accordingly, the third driving switching element Tr3 of the n-th stage STGn, which may be connected to the charged set node Q through the gate electrode, maintains the turned-on state.

In the output period To, the first clock signal CLK1 having a high voltage level may be applied to the third driving switching element Tr3 which may thus be turned on. In such exemplary embodiments, due to a coupling phenomenon arising from a parasitic capacitor of the third driving switching element Tr3 and the boost capacitor Cbst, in a case where the first clock signal CLK1 is applied to the third driving switching element Tr3, a signal of the set node Q may be bootstrapped. In addition, when the set node Q is bootstrapped, due to the coupling phenomenon of the parasitic capacitor and the boost capacitor Cbst, a signal of the output terminal OUT may also be bootstrapped. Accordingly, the turned-on third driving switching element Tr3 outputs the first clock signal CLK1, having a high voltage level, substantially without loss. In such exemplary embodiments, the turned-on third driving switching element Tr3 outputs, through the output terminal OUT, the first clock signal CLK1 having a high voltage level as the n-th gate signal GSn.

In an exemplary embodiment, as illustrated in FIG. 3, the second clock signal CLK2 maintains a low voltage level in the output period To, and the fourth driving switching element Tr4 which receives the second clock signal CLK2 having a low voltage level through the gate electrode may be turned off.

As such, in the output period To of the n-th stage STGn, the n-th gate signal GSn may be output from the n-th stage STGn.

3) Reset Period (Trs)

The operation of the n-th stage STGn in the reset period Trs of the n-th stage STGn will now be described.

In the reset period Trs of the n-th stage STGn, as illustrated in FIG. 3, the first clock signal CLK1 maintains a low voltage level, the second clock signal CLK2 maintains a high voltage level, and the (n+1)-th gate signal GSn+1 applied from the (n+1)-th stage STGn+1 maintains a high voltage level corresponding to an on voltage Von.

The (n+1)-th gate signal having a high voltage level may be applied to the gate electrode of the second driving switching element Tr2 provided in the n-th stage SGn. In such exemplary embodiments, the second driving switching element Tr2 may be turned on.

The off voltage VSS may be applied to the set node Q of the n-th stage STGn through the turned-on second driving switching element Tr2. In such exemplary embodiments, the set node Q may be discharged, and the first driving switching element Tr1 connected to the discharged set node Q through the gate electrode may be turned off.

The fourth driving switching element Tr4 which receives the second clock signal CLK2, having a high voltage level, through the gate electrode may be turned on. The off voltage VSS may be applied to the output terminal OUT of the n-th stage STGn through the turned-on fourth driving switching element Tr4. Accordingly, the output terminal OUT and the n-th gate line GLn connected to the output terminal OUT may be discharged.

Figure 5:
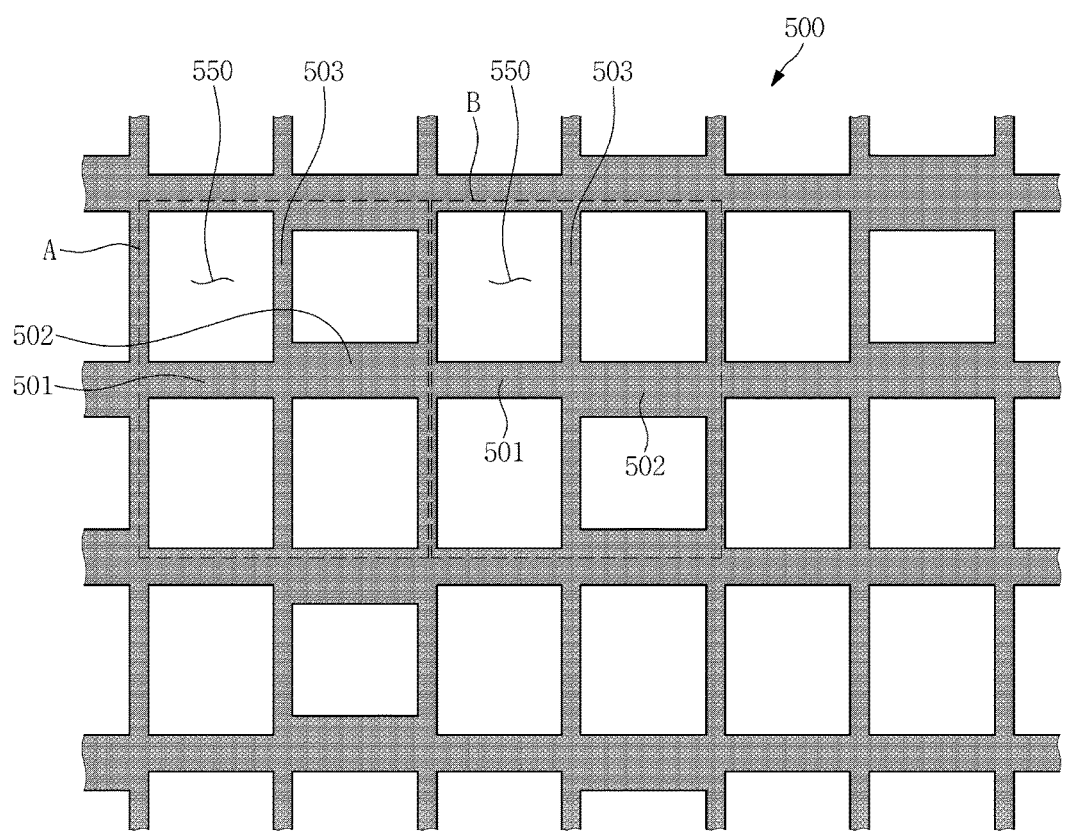
FIG. 5 is a plan view of an exemplary light blocking layer constructed according to the principles of the invention.

FIG. 5 is a plan view of an exemplary light blocking layer constructed according to the principles of the invention.

As illustrated in FIG. 5, the light blocking layer 500 includes a plurality of first light blocking portions 501, a plurality of second light blocking portions 502, and a plurality of third light blocking portions 503.

The light blocking layer 500 includes a plurality of light emission areas 550 defined by the plurality of first light blocking portions 501, the plurality of second light blocking portions 502, and the plurality of third light blocking portions 503. Each of the light emission areas 550 may be positioned to correspond to one of the pixel electrodes, respectively.

In some embodiments, the light blocking layer 500 might not include the third light blocking portion 503.

Figure 6:
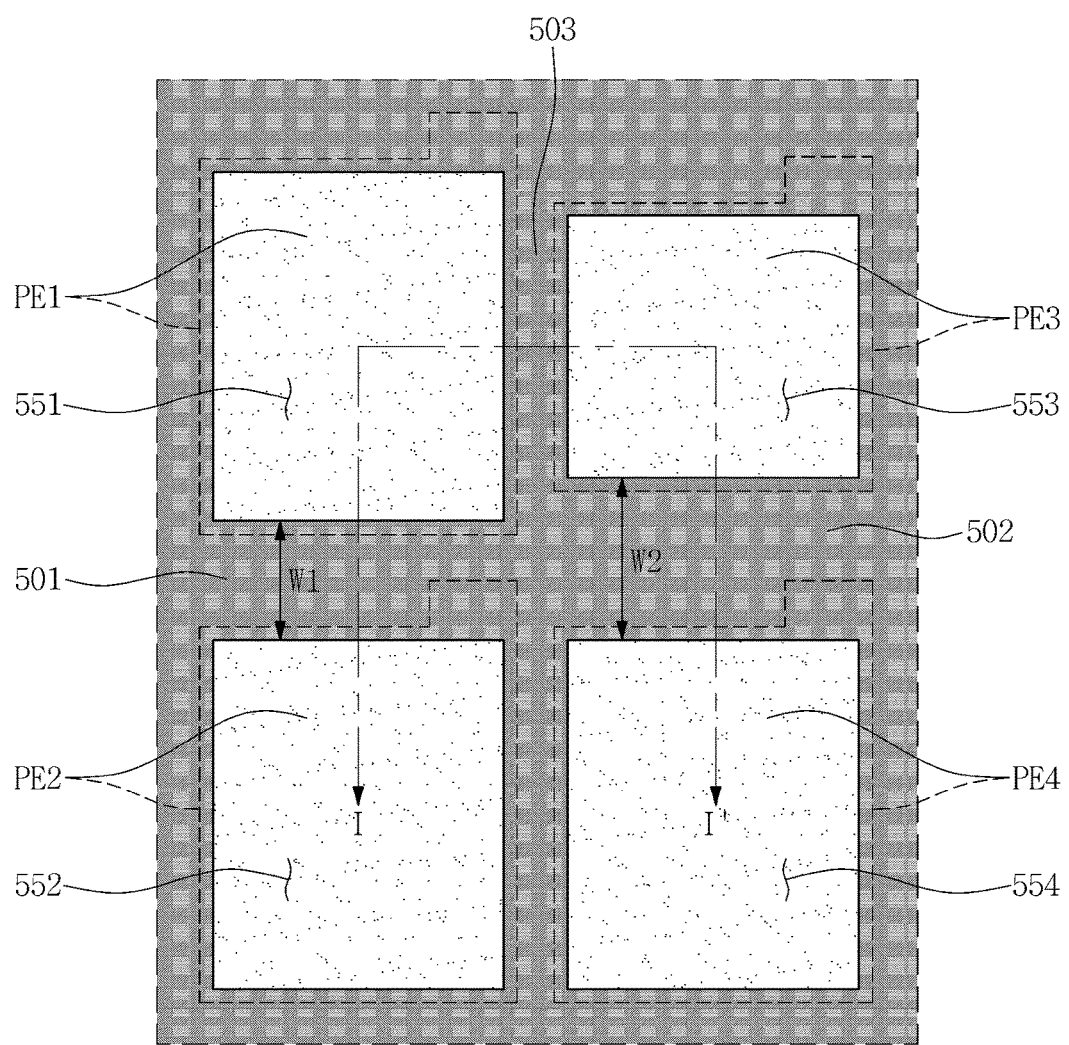
FIG. 6 is an enlarged view illustrating area A of FIG. 5.

FIG. 6 is an enlarged view illustrating area A of FIG. 5, and FIG. 7 is a cross-sectional view taken along line I-I' of FIG. 6.

An array of four adjacent pixel electrodes, for example, those illustrated in FIG. 6, may be referred to as a first pixel electrode PE1, a second pixel electrode PE2, a third pixel electrode PE3, and a fourth pixel electrode PE4, respectively. The first pixel electrode PE1 may be disposed corresponding to a first light emission area 551; the second pixel electrode PE2 may be disposed corresponding to a second light emission area 552; the third pixel electrode PE3 may be disposed corresponding to a third light emission area 553; and, the fourth pixel electrode PE4 may be disposed corresponding to a fourth light emission area 554.

An edge portion of the first pixel electrode PE1, an edge portion of the second pixel electrode PE2, an edge portion of the third pixel electrode PE3, and an edge portion of the fourth pixel electrode PE4 may overlap the light blocking layer 500. This is evident in FIG. 6 where the dotted outlines represent the outer edges of the pixel electrodes PE1, PE2, PE3, PE4. Thus, the edge portion of the first pixel electrode PE1 may overlap two first light blocking portions 501 and two third light blocking portions 503; the edge portion of the second pixel electrode PE2 may overlap two first light blocking portions 501 and two third light blocking portions 503; the edge portion of the third pixel electrode PE3 may overlap two second light blocking portions 502 and two third light blocking portions 503; and, the edge portion of the fourth pixel electrode PE4 may overlap two second light blocking portions 502 and two third light blocking portions 503.

Figure 8:
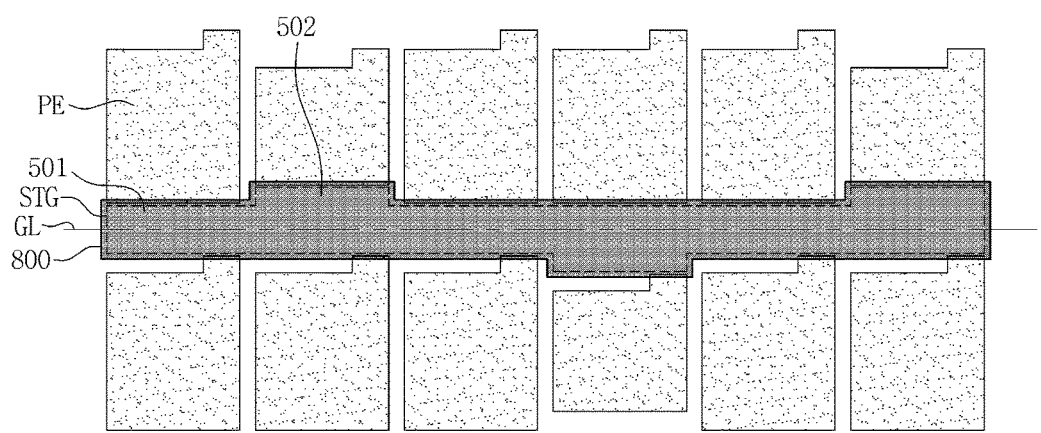
FIG. 8 is a plan view of a plurality of exemplary first light blocking portions and second blocking portions according to an embodiment of the invention disposed along a gate line.

The first light blocking portion 501 may be disposed adjacent to the first pixel electrode PE1 and the second pixel electrode PE2. A portion of the first light blocking portion 501 may be disposed between the first pixel electrode PE1 and the second pixel electrode PE2. Although not illustrated in FIG. 6, as shown in FIG. 8, the gate line may be disposed between the first pixel electrode PE1 and the second pixel electrode PE2, and the gate line overlaps the first light blocking portion 501.

The second light blocking portion 502 may be disposed adjacent to the third pixel electrode PE3 and the fourth pixel electrode PE4. A portion of the second light blocking portion 502 may be disposed between the third pixel electrode PE3 and the fourth pixel electrode PE4. Although not illustrated in FIG. 6, as shown in FIG. 8, the gate line may also be disposed between the third pixel electrode PE3 and the fourth pixel electrode PE4; and, the gate line may thus also overlap the second light blocking portion 502.

The second light blocking portion 502 may have a larger size than a size of the first light blocking portion 501. For example, as depicted, a length of the second light blocking portion 502 and a length of the first light blocking portion 501 may be the same as each other; and, a width W2 of the second light blocking portion 502 may be greater than a width W1 of the first light blocking portion 501. The second light blocking portion 502 may have an area of about 1.2 times a size of the first light blocking portion 501. Due to the size difference between the first and second light blocking portions 501 and 502, the third light emission area 553 may have a smallest size among the first, second, third, and fourth light emission areas 551, 552, 553, and 554. The first light emission area 551, the second light emission area 552, and the fourth light emission area 554 have substantially a same size in the illustrated embodiment.

The width W1 of the first light blocking portion 501 may be defined as a width of a portion of the light blocking portion between the first light emission area 551 and the second light emission area 552, and the width W2 of the second light blocking portion 502 may be defined as a width of a portion of the light blocking portion between the third light emission area 553 and the fourth light emission area 554.

As will be discussed in greater detail below in connection with the subsequent figures, at least one of the elements of the gate driver 126 may overlap the second light blocking portion 502. The elements of the gate driver 126 may include the first driving switching element Tr1, the second driving switching element Tr2, the third driving switching element Tr3, the fourth driving switching element Tr4, and the boost capacitor Cbst, and at least one of the first driving switching element Tr1, the second driving switching element Tr2, the third driving switching element Tr3, the fourth driving switching element Tr4, and the boost capacitor Cbst may be disposed between the second light blocking portion 502 and the first substrate 301. For example, at least one of the first driving switching element Tr1, the second driving switching element Tr2, the third driving switching element Tr3, the fourth driving switching element Tr4, and the boost capacitor Cbst may be disposed between the second light blocking portion 502 and the display area AR2 of the first substrate 301.

In addition, the elements of the gate driver 126 may also, or alternatively, overlap the first light blocking portion 501 and the second light blocking portion 502. For example, two of the first driving switching element Tr1, the second driving switching element Tr2, the third driving switching element Tr3, the fourth driving switching element Tr4, and the boost capacitor Cbst may overlap the first light blocking portion 501, and the other three of the first driving switching element Tr1, the second driving switching element Tr2, the third driving switching element Tr3, the fourth driving switching element Tr4, and the boost capacitor Cbst may overlap the second light blocking portion 502. In such exemplary embodiments, an element of the gate driver 126 having a relatively small size may overlap the first light blocking portion 501, where that portion is the smaller portion, and an element of the gate driver 126 having a relatively large size may overlap the second light blocking portion 502, where that portion is larger.

As illustrated in FIG. 7, various exemplary embodiments of a display device may further include a red color filter CF_R, a green color filter CF_G, a blue color filter CF_B, and a white color filter CF_W.

The four color filters CF_R, CF_G, CF_B, and CF_W may be disposed corresponding to the four adjacent pixel electrodes PE1, PE2, PE3, and PE4, respectively. For example, the blue color filter CF_B may be disposed corresponding to the first pixel electrode PE1; the red color filter CF_R may be disposed corresponding to the second pixel electrode PE2; the white color filter CF_W may be disposed corresponding to the third pixel electrode PE3; and, the green color filter CF_G may be disposed corresponding to the fourth pixel electrode PE4.

The white color filter CF_W may have the smallest size among the red color filter CF_R, the green color filter CF_G, the blue color filter CF_B, and the white color filter CF_W. The red color filter CF_R, the green color filter CF_G, and the blue color filter CF_B may have substantially the same size. Alternatively, the red color filter CF_R, the green color filter CF_G, the blue color filter CF_B, and the white color filter CF_W may all have substantially a same size.

The third pixel electrode PE3, corresponding to the white color filter CF_W, may have the smallest size among the first, second, third, and fourth pixel electrodes PE1, PE2, PE3, and PE4 that may be adjacent to one another. The first, second, and fourth pixel electrodes PE1, PE2, and PE4 may each have substantially a same size. In some other embodiments, the first, second, third, and fourth pixel electrodes PE1, PE2, PE3, and PE4 may all have substantially the same size.

The third light emission area 553, corresponding to the white color filter CF_W, may have the smallest size among the first, second, third, and fourth light emission areas 551, 552, 553, and 554. That is, the third light emission area 553 may have a smaller size than sizes of the other light emission areas 551, 552, and 554 to achieve a suitable luminance of a light mixture of a red light, a green light, a blue light, and a white light. Accordingly, an amount of light emitted through the third light emission area 553 may be less than an amount of light emitted through the first light emission area 551, an amount of light emitted through the second light emission area 552, and an amount of light emitted through the fourth light emission area 554.

The size difference between the first light emission area 551 and the third light emission area 553 may be realized by the size difference between the first light blocking portion 501 and the second light blocking portion 502. That is, as the size of the second light blocking portion 502 increases, the size of the third light emission area 553 may be reduced. In particular, as the size of the second light blocking portion 502 increases, the space for disposing the elements of the gate driver 126 may be accommodated. As such, according to various exemplary embodiments, a space for the elements of the gate driver 126 may be provided in the display area AR1 while not degrading luminance of the red light, the green light, and the blue light.

As illustrated in FIG. 7, various exemplary embodiments of a display device may further include a common electrode 320. The common electrode 320 may be disposed on the red color filter CF_R, the green color filter CF_G, the blue color filter CF_B, and the white color filter CF_W.

The third light blocking portion 503 may overlap the data line in other embodiments.

FIG. 8 is a plan view of a plurality of exemplary first light blocking portions and second blocking portions according to an embodiment of the invention disposed along a gate line.

In FIG. 8, the third light blocking portion 503 is omitted for the sake of emphasis on other features in that illustration.

As illustrated in FIG. 8, elements included in one stage STG of the stages STG1 to STGn+1 of the gate driver 126 may overlap the plurality of first light blocking portions 501 and the plurality of second light blocking portions 502 disposed along one gate line GL. Herein, the plurality of first light blocking portions 501 and the plurality of second light blocking portions 502, disposed along the gate line GL, may be defined as a gate light blocking portion 800.

Figure 9:
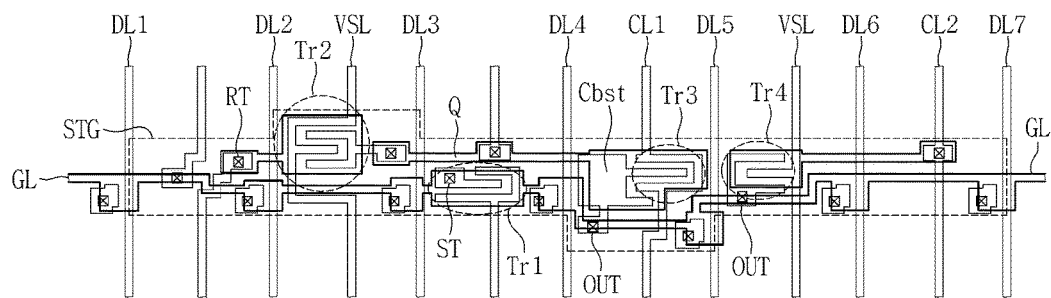
FIG. 9 is a partially schematic top sectional view of an exemplary stage of FIG. 8.

FIG. 9 is a partially schematic top sectional view of an exemplary stage of FIG. 8.

As illustrated in FIG. 9, which corresponds to an enlarged view of one stage of FIG. 8, the first driving switching element Tr1, the second driving switching element Tr2, the third driving switching element Tr3, the fourth driving switching element Tr4, and the boost capacitor Cbst included in one stage STG may overlap the gate light blocking portion 800. In such exemplary embodiments, the second driving switching element Tr2, the third driving switching element Tr3, and the boost capacitor Cbst, which have a relatively large size, may overlap the second light blocking portions 502. The others, i.e., the first driving switching element Tr1 and the fourth driving switching element Tr4, may overlap the first light blocking portions 501.

In various exemplary embodiments, the first driving switching element Tr1 provided in the stage STG illustrated in FIG. 9 may be a driving switching element that may be configured to control operation of a succeeding stage. That is, the first driving switching element Tr1 of each stage may be disposed in a previous stage.

The first clock line CL1, the second clock line CL2, and the off-voltage line VSL may be disposed between adjacent ones of the data lines DL1, DL2, DL3, DL4, DL5, DL6, and DL7.

Figure 10:
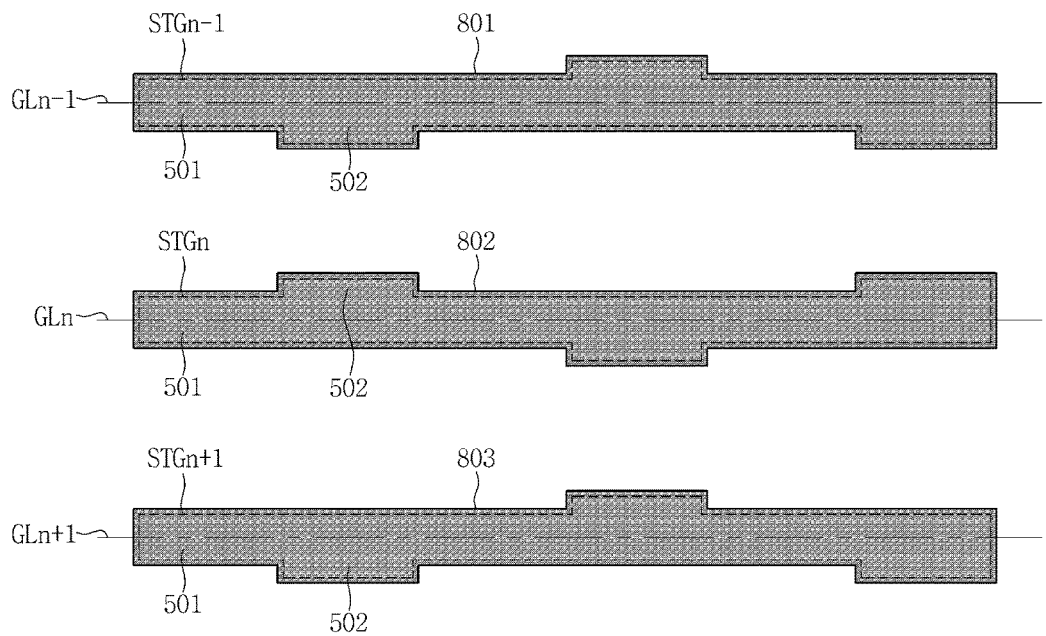
FIG. 10 is a top sectional view of three exemplary adjacent gate light blocking portions according to an embodiment of the invention.

FIG. 10 is a top sectional view of three exemplary adjacent gate light blocking portions according to an embodiment of the invention.

As illustrated in FIG. 10, an (n−1)-th gate line GLn−1 and elements of the (n−1)-th stage STGn−1 overlap an (n−1)-th gate light blocking portion 801, an n-th gate line GLn and elements of the n-th stage STGn overlap an n-th gate light blocking portion 802, and an (n+1)-th gate line GLn+1 and elements of the (n+1)-th stage STGn+1 overlap an (n+1)-th gate light blocking portion 803.

Two adjacent gate light blocking portions have a linearly symmetric shape with respect to an imaginary line that orthogonally intersects the data line. For example, the n-th gate light blocking portion 802 and the (n−1)-th gate light blocking portion 801 may be linearly symmetric with respect to the imaginary line.

In a corresponding manner, the structure detailed above in connection with FIG. 9 is symmetric in continuing portions of the apparatus. Thus, it should be apparent that, the location of the white filter CF_W described above in connection with FIG. 7 alternates between the third pixel electrodes PE3 and the fourth pixel electrodes PE4 such that the white filter CF_W corresponds to the smaller pixel electrodes PE in the larger view of the corresponding structure shown in FIG. 8 where the smaller pixel electrode alternates between PE3 and PE4 in each subsequent grouping of four pixel electrodes PE1, PE2, PE3, PE4.

Figure 11:
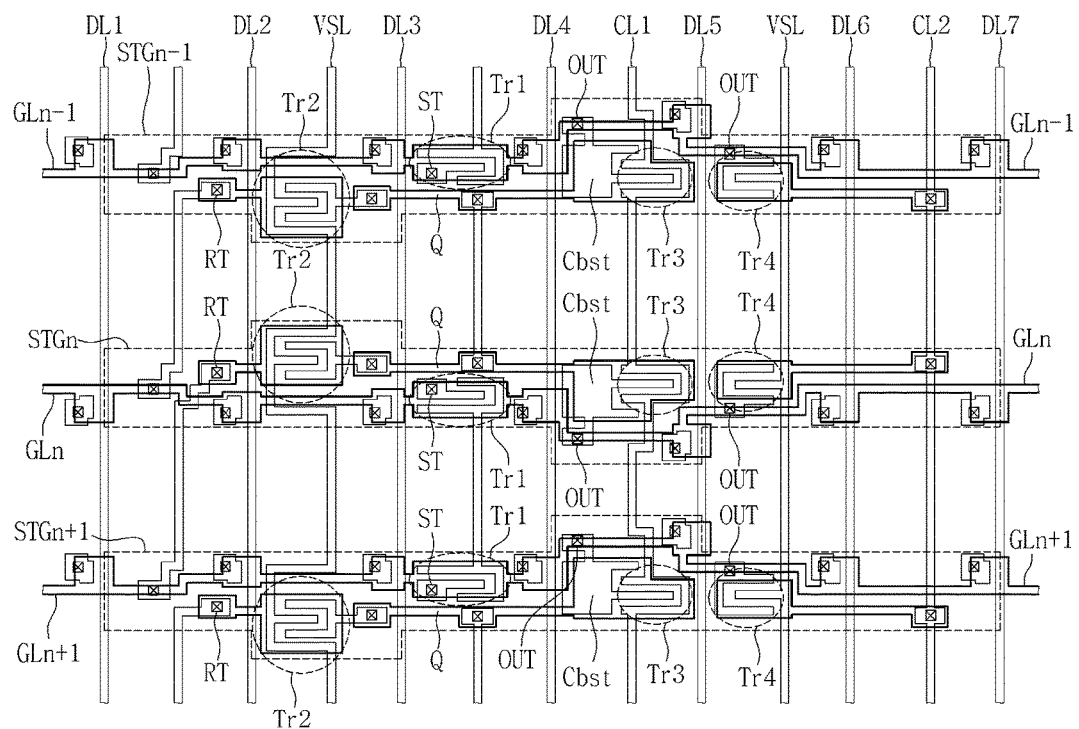
FIG. 11 is a partially schematic top sectional view of an exemplary (n−1)-th stage, an exemplary n-th stage, and an exemplary (n+1)-th stage of FIG. 10.

FIG. 11 is a partially schematic top sectional view of an exemplary (n−1)-th stage, an exemplary n-th stage, and an exemplary (n+1)-th stage of FIG. 10.

As illustrated in FIG. 11, a first driving switching element Tr1, a second driving switching element Tr2, a third driving switching element Tr3, a fourth driving switching element Tr4, and a boost capacitor Cbst included in the (n−1)-th stage STGn−1 may overlap the (n−1)-th gate light blocking portion 801. In such exemplary embodiments, the second driving switching element Tr2, the third driving switching element Tr3, and the boost capacitor Cbst, which have a relatively large size, may overlap the second light blocking portion 502. The others, i.e., the first driving switching element Tr1 and the fourth driving switching element Tr4, may overlap the first light blocking portion 501.

The first driving switching element Tr1, the second driving switching element Tr2, the third driving switching element Tr3, the fourth driving switching element Tr4, and the boost capacitor Cbst included in the n-th stage STGn may overlap the n-th gate light blocking portion 802. In such exemplary embodiments, the second driving switching element Tr2, the third driving switching element Tr3, and the boost capacitor Cbst, which have a relatively large size, may overlap the second light blocking portion 502. The others, i.e., the first driving switching element Tr1 and the fourth driving switching element Tr4, may overlap the first light blocking portion 501.

A first driving switching element Tr1, a second driving switching element Tr2, a third driving switching element Tr3, a fourth driving switching element Tr4, and a boost capacitor Cbst included in the (n+1)-th stage STGn+1 may overlap the (n+1)-th gate light blocking portion 803. In such exemplary embodiments, the second driving switching element Tr2, the third driving switching element Tr3, and the boost capacitor Cbst, which have a relatively large size, may overlap the second light blocking portion 502. The others, i.e., the first driving switching element Tr1 and the fourth driving switching element Tr4, may overlap the first light blocking portion 501.

In various exemplary embodiments, the first driving switching element Tr1 included in each of the stages STGn−1, STGn, and STGn+1 illustrated in FIG. 11 may be a driving switching element that may be configured to control operation of a succeeding stage. That is, the first driving switching element Tr1 of each of the stages STGn−1, STGn, and STGn+1 may be disposed in a previous stage. For example, the first driving switching element Tr1 of the n-th stage STGn may be disposed in the (n−1)-th stage STGn−1. Accordingly, the first driving switching element Tr1 of the n-th stage STGn overlaps the (n−1)-th gate light blocking portion 801. In some other embodiments, the first driving switching element Tr1 of the n-th stage STGn may be disposed in the n-th stage STGn. In such exemplary embodiments, the first driving switching element Tr1 of the n-th stage STGn overlaps the n-th gate light blocking portion 802.

Figure 12:
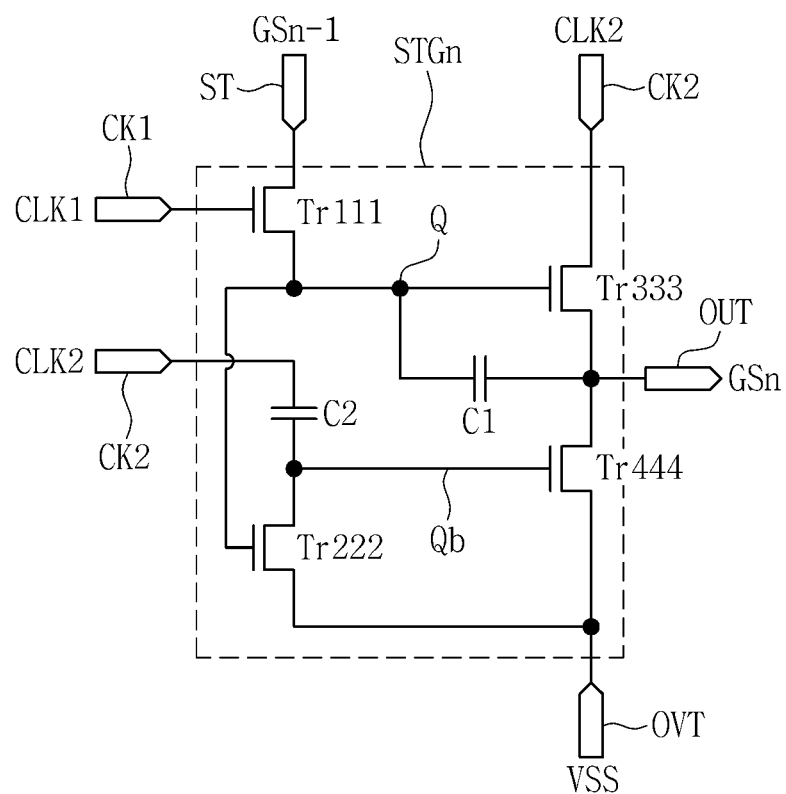
FIG. 12 is a schematic circuit diagram of another exemplary embodiment of the n-th stage.

FIG. 12 is a schematic circuit diagram of another exemplary embodiment of the n-th stage.

As illustrated in FIG. 12, the n-th stage STGn includes a first driving switching element Tr111, a second driving switching element Tr222, a third driving switching element Tr333, a fourth driving switching element Tr444, a first capacitor C1, and a second capacitor C2.

The first driving switching element Tr111 of the n-th stage STGn charges a set node Q of the n-th stage STGn based on a first clock signal CLK1. The first driving switching element Tr111 of the n-th stage STGn may be turned on or turned off by the first clock signal CLK1, and when turned on, the first driving switching element Tr111 electrically connects a set control terminal ST of the n-th stage STGn and the set node Q of the n-th stage STGn. To this end, the first driving switching element Tr111 may include a gate electrode connected to a first clock terminal CK1, a drain electrode connected to the set control terminal ST, and a source electrode connected to the set node Q.

The second driving switching element Tr222 of the n-th stage STGn discharges a reset node Qb of the n-th stage STGn based on a signal of the set node Q of the n-th stage STGn. The second driving switching element Tr222 of the n-th stage STGn may be turned on or turned off by the signal of the set node Q, and when turned on, the second driving switching element Tr222 electrically connects the reset node Qb and an off voltage terminal OVT. To this end, the second driving switching element Tr222 may include a gate electrode connected to the set node Q, a drain electrode connected to the reset node Qb, and a source electrode connected to the off voltage terminal OVT.

The third driving switching element Tr333 of the n-th stage STGn outputs a second clock signal CLK2 as an n-th gate signal GSn based on a signal of the set node Q of the n-th stage STGn. The third driving switching element Tr333 of the n-th stage STGn may be turned on or turned off by the signal of the set node Q, and when turned on, the third driving switching element Tr333 electrically connects a second clock terminal CK2 of the n-th stage STGn and an output terminal OUT of the n-th stage STGn. To this end, the third driving switching element Tr333 may include a gate electrode connected to the set node Q, a drain electrode connected to the second clock terminal CK2 and a source electrode connected to the output terminal OUT.

The fourth driving switching element Tr444 of the n-th stage STGn discharges the output terminal OUT of the n-th stage STGn based on a signal of the reset node Qb. The fourth driving switching element Tr444 of the n-th stage STGn may be turned on or turned off by the signal of the reset node Qb, and when turned on, the fourth driving switching element Tr444 electrically connects the output terminal OUT of the n-th stage STGn and the off voltage terminal OVT. To this end, the fourth driving switching element Tr444 may include a gate electrode connected to the reset node Qb, a drain electrode connected to the output terminal OUT, and a source electrode connected to the off voltage terminal OVT.

The first capacitor C1 of the n-th stage STGn may be connected between the set node Q of the n-th stage STGn and the output terminal OUT of the n-th stage STGn.

The second capacitor C2 of the n-th stage STGn may be connected between the second clock terminal CK2 of the n-th stage STGn and the reset node Qb of the n-th stage STGn.

At least one of the first driving switching element Tr111, the second driving switching element Tr222, the third driving switching element Tr333, the fourth driving switching element Tr444, the first capacitor C1, and the second capacitor C2 may overlap a second light blocking portion 502.

Figure 13:
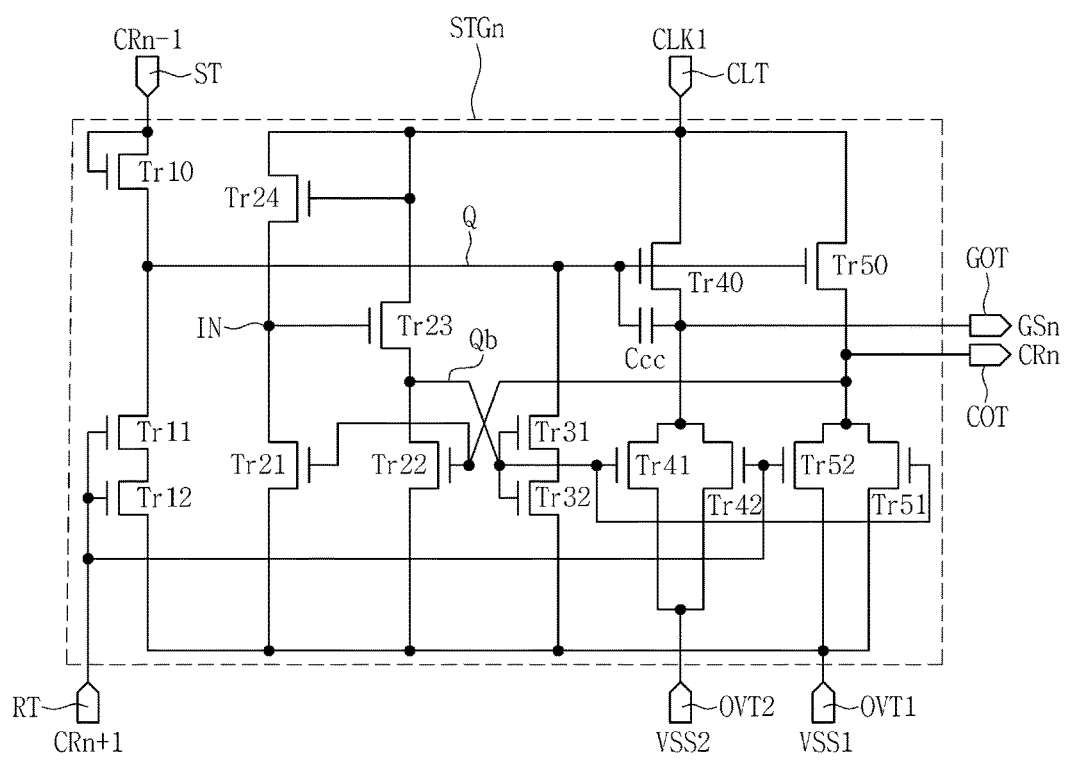
FIG. 13 is a schematic circuit diagram of still another exemplary embodiment of the n-th stage.

FIG. 13 is a schematic circuit diagram of still another exemplary embodiment of the n-th stage.

As illustrated in FIG. 13, the n-th stage STGn includes a set switching element Tr10, a first reset switching element Tr11, a second reset switching element Tr12, a first inverter switching element Tr21, a second inverter switching element Tr22, a third inverter switching element Tr23, a fourth inverter switching element Tr24, a first set discharge switching element Tr31, a second set discharge switching element Tr32, a gate output switching element Tr40, a carry output switching element Tr50, a first gate discharge switching element Tr41, a second gate discharge switching element Tr42, a first carry discharge switching element Tr51, a second carry discharge switching element Tr52, and a coupling capacitor Ccc.

The set switching element Tr10 of the n-th stage STGn charges a set node Q of the n-th stage STGn based on a set control signal. The set control signal may be an (n−1)-th carry signal CRn−1 applied from an (n−1)-th stage STGn−1. The set switching element Tr10 of the n-th stage STGn may be turned on or turned off by the (n−1)-th carry signal CRn−1, and when turned on, the set switching element Tr10 electrically connects a set control terminal ST of the n-th stage STGn and the set node Q of the n-th stage STGn. To this end, the set switching element Tr10 may include a gate electrode connected to the set control terminal ST and may be connected between the set control terminal ST and the set node Q.

The first reset switching element Tr11 of the n-th stage STGn discharges the set node Q of the n-th stage STGn based on a reset control signal. The reset control signal may be an (n+1)-th carry signal CRn+1 applied from an (n+1)-th stage STGn+1. The first reset switching element Tr11 of the n-th stage STGn may be turned on or turned off by the (n+1)-th carry signal CRn+1, and when turned on, the first reset switching element Tr11 electrically connects the set node Q of the n-th stage STGn and the second reset switching element Tr12 of the n-th stage STGn. To this end, the first reset switching element Tr11 may include a gate electrode connected to a reset control terminal RT and may be connected between the set node Q and the second reset switching element Tr12.

The second reset switching element Tr12 of the n-th stage STGn discharges the set node Q of the n-th stage STGn based on a reset control signal. The reset control signal may be the (n+1)-th carry signal CRn+1 applied from the (n+1)-th stage STGn+1. The second reset switching element Tr12 of the n-th stage STGn may be turned on or turned off by the (n+1)-th carry signal CRn+1, and when turned on, the second reset switching element Tr12 electrically connects the first reset switching element Tr11 of the n-th stage STGn and a first off-voltage input terminal OVT1 of the n-th stage STGn. To this end, the second reset switching element Tr12 may include a gate electrode connected to the reset control terminal RT and may be connected between the first reset switching element Tr11 and the first off-voltage input terminal OVT1.

The first inverter switching element Tr21 of the n-th stage STGn discharges an inverter node IN of the n-th stage STGn based on an n-th carry signal CRn applied to a carry output terminal COT of the n-th stage STGn and a control voltage VCT applied to a control terminal CT of the n-th stage STGn. The first inverter switching element Tr21 of the n-th stage STGn may be turned on or turned off by the n-th carry signal CRn and the control voltage VCT, and when turned on, the first inverter switching element Tr21 electrically connects the inverter node IN and the first off-voltage input terminal OVT1 of the n-th stage STGn. To this end, the first inverter switching element Tr21 may include a gate electrode connected to the carry output terminal COT and a sub-gate electrode connected to the control terminal CT, and may be connected between the inverter node IN and the first off-voltage input terminal OVT1. In various exemplary embodiments, the first inverter switching element Tr21 of the n-th stage STGn may receive an n-th gate signal GSn applied to a gate output terminal GOT of the n-th stage STGn, rather than the aforementioned n-th carry signal CRn.

The second inverter switching element Tr22 of the n-th stage STGn discharges a reset node Qb of the n-th stage STGn based on the n-th carry signal CRn applied to the carry output terminal COT of the n-th stage STGn and the control voltage VCT applied to the control terminal CT of the n-th stage STGn. The second inverter switching element Tr22 of the n-th stage STGn may be turned on or turned off by the n-th carry signal CRn and the control voltage VCT, and when turned on, the second inverter switching element Tr22 electrically connects the reset node Qb and the first off-voltage input terminal OVT1. To this end, the second inverter switching element Tr22 may include a gate electrode connected to the carry output terminal COT and a sub-gate electrode connected to the control terminal CT and may be connected between the reset node Qb and the first off-voltage input terminal OVT1. In various exemplary embodiments, the second inverter switching element Tr22 of the n-th stage STGn may receive the n-th gate signal GSn applied to the gate output terminal GOT of the n-th stage STGn, rather than the n-th carry signal CRn.

The third inverter switching element Tr23 of the n-th stage STGn charges or discharges the reset node Qb of the n-th stage STGn based on a signal applied to the inverter node IN of the n-th stage STGn. The third inverter switching element Tr23 of the n-th stage STGn may be turned on or turned off by the signal applied to the inverter node IN, and when turned on, the third inverter switching element Tr23 electrically connects a clock terminal CLT of the n-th stage STGn and the reset node Qb of the n-th stage STGn. To this end, the third inverter switching element Tr23 may include a gate electrode connected to the inverter node IN and may be connected between the clock terminal CLT and the reset node Qb.

The fourth inverter switching element Tr24 of the n-th stage STGn charges the inverter node IN of the n-th stage STGn based on a first clock signal CLK1 applied to the clock terminal CLT of the n-th stage STGn. The fourth inverter switching element Tr24 of the n-th stage STGn may be turned on or turned off by the first clock signal CLK1, and when turned on, the fourth inverter switching element Tr24 electrically connects the clock terminal CLT and the inverter node IN. To this end, the fourth inverter switching element Tr24 may include a gate electrode connected to the clock terminal CLT and may be connected between the clock terminal CLT and the inverter node IN.

The first set discharge switching element Tr31 of the n-th stage STGn discharges the set node Q of the n-th stage STGn based on a signal applied to the reset node Qb of the n-th stage STGn. The first set discharge switching element Tr31 of the n-th stage STGn may be turned on or turned off by the signal applied to the reset node Qb, and when turned on, the first set discharge switching element Tr31 electrically connects the set node Q of the n-th stage STGn and the second set discharge switching element Tr32 of the n-th stage STGn. To this end, the first set discharge switching element Tr31 may include a gate electrode connected to the reset node Qb and may be connected between the set node Q and the second set discharge switching element Tr32.

The second set discharge switching element Tr32 of the n-th stage STGn discharges the set node Q of the n-th stage STGn based on a signal applied to the reset node Qb of the n-th stage STGn. The second set discharge switching element Tr32 of the n-th stage STGn may be turned on or turned off by the signal applied to the reset node Qb, and when turned on, the second set discharge switching element Tr32 electrically connects the first set discharge switching element Tr31 of the n-th stage STGn and the first off-voltage input terminal OVT1 of the n-th stage STGn. To this end, the second set discharge switching element Tr32 may include a gate electrode connected to the reset node Qb and may be connected between the first set discharge switching element Tr31 and the first off-voltage input terminal OVT1.

The gate output switching element Tr40 of the n-th stage STGn outputs the first clock signal CLK1 as an n-th gate signal GSn based on a signal of the set node Q of the n-th stage STGn. The gate output switching element Tr40 of the n-th stage STGn may be turned on or turned off by the signal of the set node Q, and when turned on, the gate output switching element Tr40 electrically connects the clock terminal CLT of the n-th stage STGn and the gate output terminal GOT of the n-th stage STGn. To this end, the gate output switching element Tr40 may include a gate electrode connected to the set node Q and may be connected between the clock terminal CLT and the gate output terminal GOT.

The carry output switching element Tr50 of the n-th stage STGn outputs the first clock signal CLK1 as the n-th carry signal CRn based on a signal of the set node Q of the n-th stage STGn and an output of an output control unit 503. The carry output switching element Tr50 of the n-th stage STGn may be turned on or turned off by the signal of the set node Q and the output of the output control unit 503, and when turned on, the carry output switching element Tr50 electrically connects the clock terminal CLT of the n-th stage STGn and the carry output terminal COT of the n-th stage STGn. To this end, the carry output switching element Tr50 may include a gate electrode connected to the set node Q and a sub-gate electrode connected to an output terminal N1 of the output control unit 503, and may be connected between the clock terminal CLT and the carry output terminal COT. The output control unit 503 generates an output through the output terminal N1 of the output control unit 503.

The first gate discharge switching element Tr41 of the n-th stage STGn discharges the gate output terminal GOT of the n-th stage STGn based on a signal applied to the reset node Qb of the n-th stage STGn. The first gate discharge switching element Tr41 of the n-th stage STGn may be turned on or turned off by the signal applied to the reset node Qb, and when turned on, the first gate discharge switching element Tr41 electrically connects the gate output terminal GOT and a second off-voltage input terminal OVT2 of the n-th stage STGn. To this end, the first gate discharge switching element Tr41 may include a gate electrode connected to the reset node Qb and may be connected between the gate output terminal GOT and the second off-voltage input terminal OVT2. In various exemplary embodiments, the first gate discharge switching element Tr41 may receive a first off voltage VSS1 rather than a second off voltage VSS2.

The second gate discharge switching element Tr42 of the n-th stage STGn discharges the gate output terminal GOT of the n-th stage STGn based on the reset control signal. The reset control signal may be the (n+1)-th carry signal CRn+1 applied from the (n+1)-th stage STGn+1. The second gate discharge switching element Tr42 of the n-th stage STGn may be turned on or turned off by the (n+1)-th carry signal CRn+1, and when turned on, the second gate discharge switching element Tr42 electrically connects the gate output terminal GOT and the second off-voltage input terminal OVT2 of the n-th stage STGn. To this end, the second gate discharge switching element Tr42 may include a gate electrode connected to the reset control terminal RT of the n-th stage STGn, and may be connected between the gate output terminal GOT and the second off-voltage input terminal OVT2. In various exemplary embodiments, the second gate discharge switching element Tr42 may receive the first off voltage VSS1 rather than the second off voltage VSS2.

The first carry discharge switching element Tr51 of the n-th stage STGn discharges the carry output terminal COT of the n-th stage STGn based on a signal applied to the reset node Qb of the n-th stage STGn. The first carry discharge switching element Tr51 of the n-th stage STGn may be turned on or turned off by the signal applied to the reset node Qb, and when turned on, the first carry discharge switching element Tr51 electrically connects the carry output terminal COT and the first off-voltage input terminal OVT1 of the n-th stage STGn. To this end, the first carry discharge switching element Tr51 may include a gate electrode connected to the reset node Qb, and may be connected between the carry output terminal COT and the first off-voltage input terminal OVT1. In various exemplary embodiments, the first carry discharge switching element Tr51 may receive the second off voltage VSS2 rather than the first off voltage VSS1.

The second carry discharge switching element Tr52 of the n-th stage STGn discharges the carry output terminal COT of the n-th stage STGn based on the reset control signal. The reset control signal may be the (n+1)-th carry signal CRn+1 applied from the (n+1)-th stage STGn+1. The second carry discharge switching element Tr52 of the n-th stage STGn may be turned on or turned off by the (n+1)-th carry signal CRn+1, and when turned on, the second carry discharge switching element Tr52 electrically connects the carry output terminal COT and the first off-voltage input terminal OVT1 of the n-th stage STGn. To this end, the second carry discharge switching element Tr52 may include a gate electrode connected to the reset control terminal RT of the n-th stage STGn, and may be connected between the carry output terminal COT and the first off-voltage input terminal OVT1. In various exemplary embodiments, the second carry discharge switching element Tr52 may receive the second off voltage VSS2 rather than the first off voltage VSS1.

The coupling capacitor Ccc of the n-th stage STGn may be connected between the set node Q of the n-th stage STGn and the gate output terminal GOT of the n-th stage STGn. In various exemplary embodiments, the coupling capacitor Ccc may be substituted with a parasitic capacitor between the gate electrode of the gate output switching element Tr40 and the source electrode of the gate output switching element Tr40. Herein, the source electrode of the gate output switching element Tr40 corresponds to the gate output terminal GOT of the n-th stage STGn.

At least one of the set switching element Tr10, the first reset switching element Tr11, the second reset switching element Tr12, the first inverter switching element Tr21, the second inverter switching element Tr22, the third inverter switching element Tr23, the fourth inverter switching element Tr24, the first set discharge switching element Tr31, the second set discharge switching element Tr32, the gate output switching element Tr40, the carry output switching element Tr50, the first gate discharge switching element Tr41, the second gate discharge switching element Tr42, the first carry discharge switching element Tr51, the second carry discharge switching element Tr52, and the coupling capacitor Ccc may overlap a second light blocking portion 502.

Figure 14:
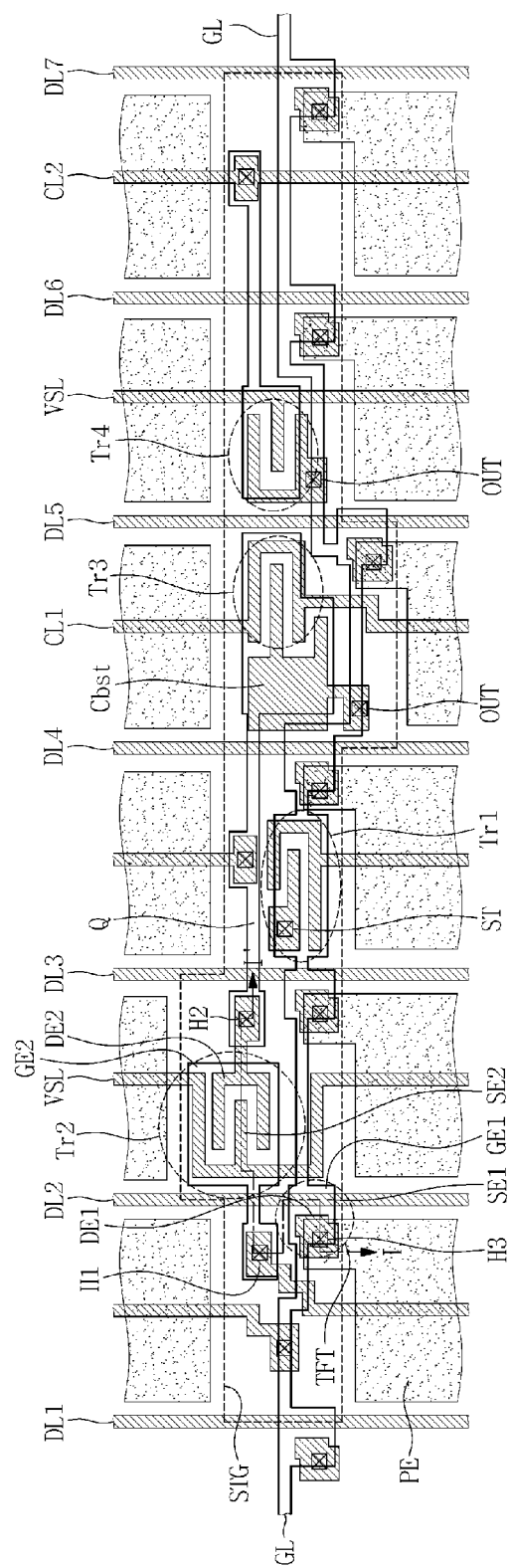
FIG. 14 is a top sectional view of an exemplary stage and pixels in the vicinity of the stage according to another embodiment of the invention.
Figure 15:
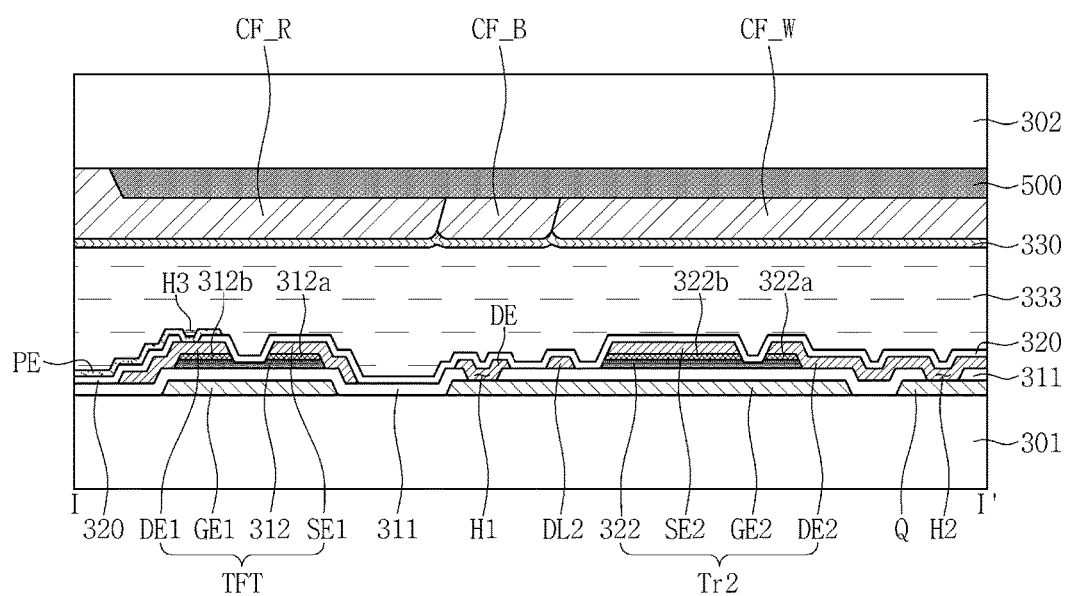
FIG. 15 is a cross-sectional view taken along line I-I' of FIG. 14.

FIG. 14 is a top sectional view of an exemplary stage and pixels in the vicinity of the stage according to another embodiment of the invention, and FIG. 15 is a cross-sectional view taken along line I-I' of FIG. 14.

Referring now to FIG. 14 and FIG. 15, respective pixel switching elements of pixels and first, second, third, and fourth driving switching elements of a gate driver, as described above, may be disposed on a first substrate 301. Hereinbelow, exemplary configurations of a pixel switching element TFT and a driving switching element (e.g., the second driving switching element Tr2) included in a single pixel will be described in detail.

The pixel switching element TFT includes a first gate electrode GE1, a first source electrode SE1, a first drain electrode DE1, and a first semiconductor layer 321.

The second driving switching element Tr2 includes a second gate electrode GE2, a second source electrode SE2, a second drain electrode DE2, and a second semiconductor layer 322.

The first gate electrode GE1, the second gate electrode GE2, and a set node Q may be disposed on the first substrate 301.

The first gate electrode GE may have a shape protruding from a gate line GL. The gate electrode GE and the gate line GL may be unitary. The gate electrode GE may be a portion of the gate line GL.

The second gate electrode GE may be connected to a drain electrode DE of a first switching element provided in a succeeding stage through a first contact hole H1.

At least one of the gate line GL, the first gate electrode GE1, the second gate electrode GE2, and the set node Q may include or be formed of aluminum (Al) or alloys thereof, silver (Ag) or alloys thereof, copper (Cu) or alloys thereof, and/or molybdenum (Mo) or alloys thereof. In some other embodiments, at least one of the gate line GL, the first gate electrode GE1, the second gate electrode GE2, and the set node Q may include or be formed of one of chromium (Cr), tantalum (Ta), and titanium (Ti). In some other embodiments, at least one of the gate line GL, the first gate electrode GE1, the second gate electrode GE2, and the set node Q may have a multilayer structure including at least two conductive layers that have different physical properties from one another.

As illustrated in FIG. 15, a gate insulating layer 311 may be disposed on the gate line GL, the first gate electrode GE1, the second gate electrode GE2, and the set node Q. The gate insulating layer 311 may be disposed over an entire surface of the first substrate 301 including the gate line GL, the first gate electrode GE1, the second gate electrode GE2, and the set node Q. As illustrated in FIG. 15, the gate insulating layer 311 may be defined with a first contact hole H1 defined on the second gate electrode GE2 and a second contact hole H2 defined on the set node Q.

The gate insulating layer 311 may include or be formed of silicon nitride (SiNx) or silicon oxide (SiOx). The gate insulating layer 311 may have a multilayer structure including at least two insulating layers having different physical properties.

The first semiconductor layer 321 and the second semiconductor layer 322 may be disposed on the gate insulating layer 311.

The first semiconductor layer 321 overlaps the first gate electrode GE1, the first source electrode SE1, and the first drain electrode DE1. The second semiconductor layer 322 overlaps the second gate electrode GE2, the second source electrode SE2, and the second drain electrode DE2.

At least one of the first semiconductor layer 321 and the second semiconductor layer 322 may include or be formed of amorphous silicon, polycrystalline silicon, or the like.

The first source electrode SE1 may be disposed on the first semiconductor layer 321 and the gate insulating layer 311. The first source electrode SE1 overlaps the first semiconductor layer 321 and the first gate electrode GE1. The first source electrode SE1 may have a shape protruding from a second data line DL2. The first source electrode SE1 and the second data line DL2 may be unitary. The first source electrode SE1 may be a portion of the second data line DL2

The first drain electrode DE1 may be disposed on the first semiconductor layer 321 and the gate insulating layer 311, spaced apart from the first source electrode SE1 at a predetermined distance. The first drain electrode DE1 overlaps the first semiconductor layer 321 and the first gate electrode GE1. A channel area of the pixel switching element TFT may be disposed between the first drain electrode DE1 and the first source electrode SE1.

The second source electrode SE2 may be disposed on the second semiconductor layer 322 and the gate insulating layer 311. The second source electrode SE2 overlaps the second semiconductor layer 322 and the second gate electrode GE2. The second source electrode SE2 and an off-voltage line VSL may be unitary. The second source electrode SE2 may be a portion of the off-voltage line VSL.

Spaced apart from the second source electrode SE2 at a predetermined distance, the second drain electrode DE2 may be disposed on the second semiconductor layer 322, the gate insulating layer 311, and the set node Q. The second drain electrode DE2 may be connected to the set node Q through the second contact hole H2. The second drain electrode DE2 overlaps the second semiconductor layer 322, the second gate electrode GE2, and the set node Q. A channel area of the second driving switching element Tr2 may be disposed between the second drain electrode DE2 and the second source electrode SE2.

The second data line DL2 may be disposed on the gate insulating layer 311.

At least one of the first source electrode SE1, the first drain electrode DE1, the second source electrode SE2, the second drain electrode DE2, and the second data line DL2 may include or be formed of a refractory metal, such as molybdenum, chromium, tantalum, and titanium, or an alloy thereof. At least one of the first source electrode SE1, the first drain electrode DE1, the second source electrode SE2, the second drain electrode DE2, and the second data line DL2 may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In some other embodiments, at least one of the first source electrode SE1, the first drain electrode DE1, the second source electrode SE2, the second drain electrode DE2, and the second data line DL2 may include or be formed of any suitable metals or conductors rather than the aforementioned materials.

The pixel switching element TFT may further include a first ohmic contact layer 321a and a second ohmic contact layer 321b.

The first ohmic contact layer 321a may be disposed between the first semiconductor layer 321 and the first source electrode SE1. The first ohmic contact layer 321a reduces an interfacial resistance between the first semiconductor layer 321 and the first source electrode SE1.

The first ohmic contact layer 321a may include silicide or n+ hydrogenated amorphous silicon doped with n-type impurities, e.g., phosphorus (P) or phosphine ($PH_3$), at high concentration.

The second ohmic contact layer 321b may be disposed between the second semiconductor layer 322 and the second drain electrode DE2. The second ohmic contact layer 321b reduces an interfacial resistance between the second semiconductor layer 322 and the second drain electrode DE2. The second ohmic contact layer 321b may include substantially a same material and have substantially a same structure (a multilayer structure) as those of the first ohmic contact layer 321a. The first ohmic contact layer 321a and the second ohmic contact layer 321b may be simultaneously provided in substantially a same process.

In some other embodiments, the first semiconductor layer 321 may be further disposed between the gate insulating layer 311 and the first source electrode SE1. In addition, the first semiconductor layer 321 may be further disposed between the gate insulating layer 311 and the first drain electrode DE1. Herein, the semiconductor layer between the gate insulating layer 311 and the first source electrode SE1 may be defined as a first additional semiconductor layer, and the semiconductor layer between the gate insulating layer 311 and the first drain electrode DE1 may be defined as a second additional semiconductor layer. In such exemplary embodiments, the aforementioned first ohmic contact layer 321a may be further disposed between the first additional semiconductor layer and the first source electrode SE1, and the aforementioned second ohmic contact layer 321b may be further disposed between the second additional semiconductor layer and the first drain electrode DEL In addition, the first semiconductor layer 321 may be further disposed between the gate insulating layer 311 and the second data line DL2. Herein, the semiconductor layer between the gate insulating layer 311 and the second data line DL2 may be defined as a third additional semiconductor layer. In such exemplary embodiments, the aforementioned first ohmic contact layer 321a may be further disposed between the third additional semiconductor layer and the data line.

The second driving switching element Tr2 may further include a third ohmic contact layer 322a and a fourth ohmic contact layer 322b.

The third ohmic contact layer 322a may be disposed between the second semiconductor layer 322 and the second source electrode SE2. The third ohmic contact layer 322a reduces an interfacial resistance between the second semiconductor layer 322 and the second source electrode SE2.

The fourth ohmic contact layer 322b may be disposed between the second semiconductor layer 322 and the second drain electrode DE2. The fourth ohmic contact layer 322b reduces an interfacial resistance between the second semiconductor layer 322 and the second drain electrode DE2.

At least one of the third ohmic contact layer 322a and the fourth ohmic contact layer 322b may include substantially the same material and have substantially the same structure (a multilayer structure) as those of the first ohmic contact layer 321a. The third ohmic contact layer 322a and the first ohmic contact layer 321a may be simultaneously provided in substantially the same process.

The second semiconductor layer 322 may be further disposed between the gate insulating layer 311 and the second source electrode SE2. In addition, the second semiconductor layer 322 may be further disposed between the gate insulating layer 311 and the second drain electrode DE2. Herein, the semiconductor layer between the gate insulating layer 311 and the second source electrode SE2 may be defined as a fourth additional semiconductor layer, and the semiconductor layer between the gate insulating layer 311 and the second drain electrode DE2 may be defined as a fifth additional semiconductor layer. In such exemplary embodiments, the aforementioned third ohmic contact layer 322a may be further disposed between the fourth additional semiconductor layer and the second source electrode SE2, and the aforementioned fourth ohmic contact layer 322b may be further disposed between the fifth additional semiconductor layer and the second drain electrode DE2.

A passivation layer 320 may be disposed on the first source electrode SE1, the first drain electrode DE1, the second source electrode SE2, the second drain electrode DE2, the second data line DL2, and the gate insulating layer 311. The passivation layer 320 may be disposed over an entire surface of the first substrate 301 including the first source electrode SE1, the first drain electrode DE1, the second source electrode SE2, the second drain electrode DE2, the second data line DL2, and the gate insulating layer 311. The passivation layer 320 may be defined with a hole (hereinafter, a second hole) on the drain electrode DE. In addition, the passivation layer 320 may be defined with a third contact hole H3 on the first drain electrode DE1.

The passivation layer 320 may include an inorganic insulating material such as silicon nitride ($SiN_x$) or silicon oxide ($SiO_x$), and in such exemplary embodiments, an inorganic insulating material having photosensitivity and having a dielectric constant of about 4.0 may be used. In some other embodiments, the passivation layer 320 may have a double-layer structure including a lower inorganic layer and an upper organic layer. The passivation layer 320 may have a thickness greater than or equal to about 5000 Å, e.g., in a range of about 6000 Å to about 8000 Å.

A pixel electrode PE may be disposed on the passivation layer 320. The pixel electrode PE may be connected to the first drain electrode DE1 through the third contact hole H3.

The pixel electrode PE may include a transparent conductive material such as indium tin oxide (ITO) or indium zinc oxide (IZO). In such exemplary embodiments, ITO may be a monocrystalline material or a polycrystalline material. Similarly, IZO may be a monocrystalline material or a polycrystalline material. In some other embodiments, IZO may be an amorphous material.

Figure 16:
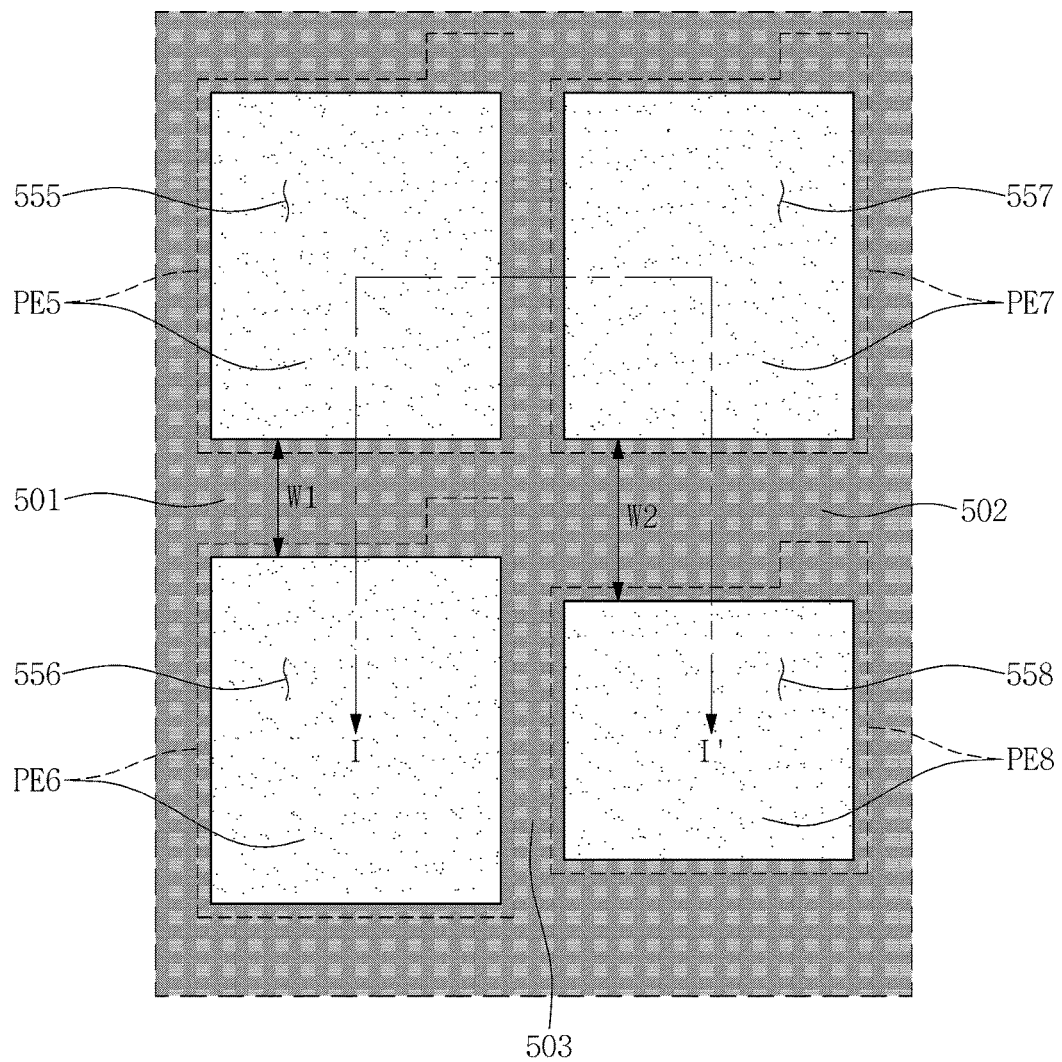
FIG. 16 is an enlarged view illustrating area B of FIG. 5.
Figure 17:
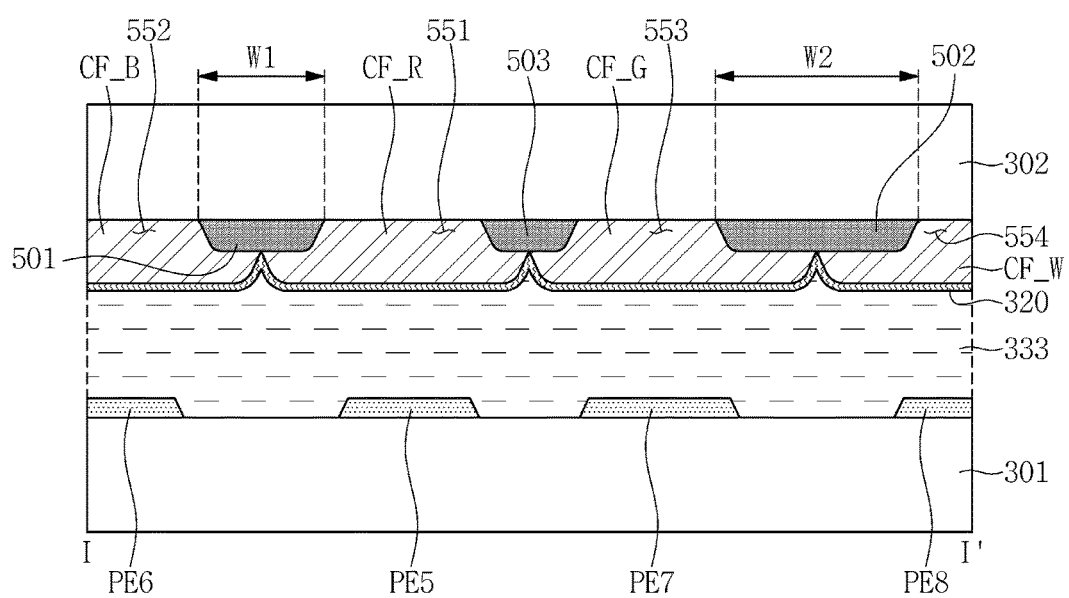
FIG. 17 is a cross-sectional view taken along line I-I' of FIG. 16.

FIG. 16 is an enlarged view illustrating area B of FIG. 5, and FIG. 17 is a cross-sectional view taken along line I-I' of FIG. 16

An array of four adjacent pixel electrodes, for example, those illustrated in FIG. 16, may be referred to as a fifth pixel electrode PE5, a sixth pixel electrode PE6, a seventh pixel electrode PE7, and an eighth pixel electrode PE8, respectively. The fifth pixel electrode PE5 may be disposed corresponding to a fifth light emission area 555; the sixth pixel electrode PE6 may be disposed corresponding to a sixth light emission area 556; the seventh pixel electrode PE7 may be disposed corresponding to a seventh light emission area 557; and, the eighth pixel electrode PE8 may be disposed corresponding to an eighth light emission area 558.

The fifth pixel electrode PE5 is adjacent to the third pixel electrode PE3. The seventh pixel electrode PE7 is adjacent to the fifth pixel electrode PE5. The sixth pixel electrode PE6 is adjacent to the fourth pixel electrode PE4. The eighth pixel electrode PE8 is adjacent to the sixth pixel electrode PE6.

The gate line GL extends between the fifth pixel electrode PE5 and the sixth pixel electrode PE6. The gate line GL extends between the seventh pixel electrode PE7 and the eighth pixel electrode PE8.

An edge portion of the fifth pixel electrode PE5, an edge portion of the sixth pixel electrode PE6, an edge portion of the seventh pixel electrode PE7, and an edge portion of the eighth pixel electrode PE8 may overlap the light blocking layer 500. This is evident in FIG. 16 where the dotted outlines represent the outer edges of the pixel electrodes PE5, PE6, PE7, PE8. Thus, the edge portion of the fifth pixel electrode PE5 may overlap two first light blocking portions 501 and two third light blocking portions 503; the edge portion of the sixth pixel electrode PE6 may overlap two first light blocking portions 501 and two third light blocking portions 503; the edge portion of the seventh pixel electrode PE7 may overlap two second light blocking portions 502 and two third light blocking portions 503; and, the edge portion of the eighth pixel electrode PE8 may overlap two second light blocking portions 502 and two third light blocking portions 503.

The first light blocking portion 501 may be disposed adjacent to the fifth pixel electrode PE5 and the sixth pixel electrode PE6. A portion of the first light blocking portion 501 may be disposed between the fifth pixel electrode PE5 and the sixth pixel electrode PE6. Although not illustrated in FIG. 16, as shown in FIG. 8, the gate line GL may be disposed between the fifth pixel electrode PE5 and the sixth pixel electrode PE6, and the gate line GL overlaps the first light blocking portion 501.

The second light blocking portion 502 may be disposed adjacent to the seventh pixel electrode PE7 and the eighth pixel electrode PE8. A portion of the second light blocking portion 502 may be disposed between the seventh pixel electrode PE7 and the eighth pixel electrode PE8. Although not illustrated in FIG. 16, as shown in FIG. 8, the gate line GL may also be disposed between the seventh pixel electrode PE7 and the eighth pixel electrode PE8; and, the gate line GL may thus also overlap the second light blocking portion 502.

The second light blocking portion 502 may have a larger size than a size of the first light blocking portion 501. For example, as depicted, a length of the second light blocking portion 502 and a length of the first light blocking portion 501 may be the same as each other; and, a width W2 of the second light blocking portion 502 may be greater than a width W1 of the first light blocking portion 501. The second light blocking portion 502 may have an area of about 1.2 times a size of the first light blocking portion 501. Due to the size difference between the first and second light blocking portions 501 and 502, the eighth light emission area 558 may have a smallest size among the fifth, sixth, seventh, and eighth light emission areas 555, 556, 557, and 558. The fifth light emission area 555, the sixth light emission area 556, and the seventh light emission area 557 have substantially a same size in the illustrated embodiment.

The width W1 of the first light blocking portion 501 may be defined as a width of a portion of the light blocking portion between the fifth light emission area 555 and the sixth light emission area 556, and the width W2 of the second light blocking portion 502 may be defined as a width of a portion of the light blocking portion between the seventh light emission area 557 and the eighth light emission area 558.

As will be discussed in greater detail below in connection with the subsequent figures, at least one of the elements of the gate driver 126 may overlap the second light blocking portion 502. The elements of the gate driver 126 may include the first driving switching element Tr1, the second driving switching element Tr2, the third driving switching element Tr3, the fourth driving switching element Tr4, and the boost capacitor Cbst, and at least one of the first driving switching element Tr1, the second driving switching element Tr2, the third driving switching element Tr3, the fourth driving switching element Tr4, and the boost capacitor Cbst may be disposed between the second light blocking portion 502 and the first substrate 301. For example, at least one of the first driving switching element Tr1, the second driving switching element Tr2, the third driving switching element Tr3, the fourth driving switching element Tr4, and the boost capacitor Cbst may be disposed between the second light blocking portion 502 and the display area AR2 of the first substrate 301.

In addition, the elements of the gate driver 126 may also, or alternatively, overlap the first light blocking portion 501 and the second light blocking portion 502. For example, two of the first driving switching element Tr1, the second driving switching element Tr2, the third driving switching element Tr3, the fourth driving switching element Tr4, and the boost capacitor Cbst may overlap the first light blocking portion 501, and the other three of the first driving switching element Tr1, the second driving switching element Tr2, the third driving switching element Tr3, the fourth driving switching element Tr4, and the boost capacitor Cbst may overlap the second light blocking portion 502. In such exemplary embodiments, an element of the gate driver 126 having a relatively small size may overlap the first light blocking portion 501, where that portion is the smaller portion, and an element of the gate driver 126 having a relatively large size may overlap the second light blocking portion 502, where that portion is larger.

As illustrated in FIG. 17, various exemplary embodiments of a display device may further include a red color filter CF_R, a green color filter CF_G, a blue color filter CF_B, and a white color filter CF_W.

The four color filters CF_R, CF_B, CF_G, and CF_W may be disposed corresponding to the four adjacent pixel electrodes PE5, PE6, PE7, and PE8, respectively. For example, the red color filter CF_R may be disposed corresponding to the fifth pixel electrode PE5; the blue color filter CF_B may be disposed corresponding to the sixth pixel electrode PE6; the green color filter CF_G may be disposed corresponding to the seventh pixel electrode PE7; and, the white color filter CF_W may be disposed corresponding to the eighth pixel electrode PE8.

The white color filter CF_W may have the smallest size among the red color filter CF_R, the green color filter CF_G, the blue color filter CF_B, and the white color filter CF_W. The red color filter CF_R, the green color filter CF_G, and the blue color filter CF_B may have substantially the same size. Alternatively, the red color filter CF_R, the green color filter CF_G, the blue color filter CF_B, and the white color filter CF_W may all have substantially a same size.

The eighth pixel electrode PE8, corresponding to the white color filter CF_W, may have the smallest size among the fifth, sixth, seventh, and eighth pixel electrodes PE5, PE6, PE7, and PE8 that may be adjacent to one another. The fifth, sixth, and seventh pixel electrodes PE5, PE6, and PE7 may each have substantially a same size. In some other embodiments, the fifth, sixth, seventh, and eighth pixel electrodes PE5, PE6, PE7, and PE8 may all have substantially the same size.

The eighth light emission area 558, corresponding to the white color filter CF_W, may have the smallest size among the fifth, sixth, seventh, and eighth light emission areas 555, 556, 557, and 558. That is, the eighth light emission area 558 may have a smaller size than sizes of the other light emission areas 555, 556, and 557 to achieve a suitable luminance of a light mixture of a red light, a green light, a blue light, and a white light. Accordingly, an amount of light emitted through the eighth light emission area 558 may be less than an amount of light emitted through the fifth light emission area 555, an amount of light emitted through the sixth light emission area 556, and an amount of light emitted through the seventh light emission area 557.

The size difference between the sixth light emission area 556 and the eight light emission area 558 may be realized by the size difference between the first light blocking portion 501 and the second light blocking portion 502. That is, as the size of the second light blocking portion 502 increases, the size of the eight light emission area 558 may be reduced. In particular, as the size of the second light blocking portion 502 increases, the space for disposing the elements of the gate driver 126 may be accommodated. As such, according to various exemplary embodiments, a space for the elements of the gate driver 126 may be provided in the display area AR1 while not degrading luminance of the red light, the green light, and the blue light.

As set forth hereinabove, one or more exemplary embodiments of a display device may provide the following effects.

One or more exemplary embodiments of the display device include a second light blocking portion that may have a larger size than a size of a first light blocking portion. As the size of the second light blocking portion increases, a space for disposing elements of a gate driver may be provided in a corresponding manner. In addition, as the larger space may be positioned in the vicinity of a white color filter, the space for disposing the elements of the gate driver may be sufficiently provided while not degrading luminance of a red color filter, a green color filter, and a blue color filter.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:
1. A display device comprising:
 first and second adjacent pixel electrodes, and third and fourth adjacent pixel electrodes;
 a gate line extending between the first pixel electrode and the second pixel electrode and between the third pixel electrode and the fourth pixel electrode;

a gate driver having a plurality of elements disposed on a substrate and configured to drive the gate line; and a light blocking layer overlapping the gate line, wherein the light blocking layer comprises a first light blocking portion and a second light blocking portion, the first light blocking portion is adjacent to the first pixel electrode and the second pixel electrode, the second light blocking portion is adjacent to the third pixel electrode and the fourth pixel electrode, the second light blocking portion having a larger size than a size of the first light blocking portion, at least one of the plurality of elements of the gate driver overlaps the second light blocking portion, and at least one of the plurality of elements of the gate driver overlaps the second light blocking portion in a display area of the substrate.

2. The display device as claimed in claim 1, further comprising a first white color filter disposed corresponding to the third pixel electrode.

3. The display device as claimed in claim 1, wherein the third pixel electrode has a different size from a size of the fourth pixel electrode.

4. The display device as claimed in claim 3, further comprising a first white color filter disposed corresponding to the third pixel electrode that has a smaller size than a size of the other.

5. The display device as claimed in claim 1, wherein the third pixel electrode has a smaller size than a size of the other, and the first pixel electrode has substantially the same size as the second pixel electrode, the second pixel electrode has substantially the same size as the fourth pixel electrode.

6. The display device as claimed in claim 5, further comprising:

a first white color filter disposed corresponding to the third pixel electrode; and a red color filter, a green color filter, and a blue color filter respectively disposed corresponding to the first pixel electrode, the second pixel electrode, and the fourth pixel electrode.

7. The display device as claimed in claim 1, wherein at least another of the plurality of elements of the gate driver overlaps the first light blocking portion.

8. The display device as claimed in claim 7, wherein a size of the element overlapping the second light blocking portion is larger than a size of the element overlapping the first light blocking portion.

9. The display device as claimed in claim 1, wherein the plurality of elements of the gate driver comprise at least one driving switching element and at least one capacitor.

10. The display device as claimed in claim 1, wherein the second light blocking portion has substantially a same length as a length of the first light blocking portion, and the second light blocking portion has a greater width than a width of the first light blocking portion.

11. The display device as claimed in claim 1, wherein the plurality of elements of the gate driver comprise:

a first driving switching element controlled based on a previous gate signal applied from a previous gate line and connected between the previous gate line and a set node;

a second driving switching element controlled based on a succeeding gate signal applied from a succeeding gate line and connected between the set node and an off-voltage line;

a third driving switching element controlled based on a voltage applied from the set node and connected between a first clock line and the gate line; and a capacitor connected between the set node and the gate line.

12. The display device as claimed in claim 11, wherein the plurality of elements of the gate driver further comprise a fourth driving switching element controlled based on a second clock signal applied from a second clock line and connected between the gate line and the off-voltage line.

13. The display device as claimed in claim 12, wherein at least one of the first driving switching element and the fourth driving switching element overlaps the first light blocking portion.

14. The display device as claimed in claim 11, wherein at least one of the second driving switching element, the third driving switching element, and the capacitor overlaps the second light blocking portion.

15. The display device as claimed in claim 1, further comprising a data line intersecting the gate line, wherein the light blocking layer further comprises a third light blocking portion overlapping the data line.

16. The display device as claimed in claim 1, wherein at least one of the plurality of elements is disposed between the display area of the substrate and the second light blocking portion.

17. The display device as claimed in claim 1, further comprising a fifth pixel electrode adjacent to the third pixel electrode, a sixth pixel electrode adjacent to the fourth pixel electrode, a seventh pixel electrode adjacent to the fifth pixel electrode, and an eighth pixel electrode adjacent to the sixth pixel electrode, wherein the gate line extends between the fifth pixel electrode and the sixth pixel electrode and between the seventh pixel electrode and the eight pixel electrode.

18. The display device as claimed in claim 17, further comprising a second white color filter disposed corresponding to the eighth pixel electrode.

19. The display device as claimed in claim 17, wherein the eighth pixel electrode has a smaller size than a size of the other, and the fifth pixel electrode has substantially the same size as the sixth pixel electrode, the sixth pixel electrode has substantially the same size as the seventh pixel electrode.

* * * * *